Oct. 10, 1933.                E. BLOMQUIST                1,930,156
                                 SUBSTATION
                         Filed March 25, 1929        33 Sheets-Sheet 1

Fig. 1.

Inventor
Ernst Blomquist

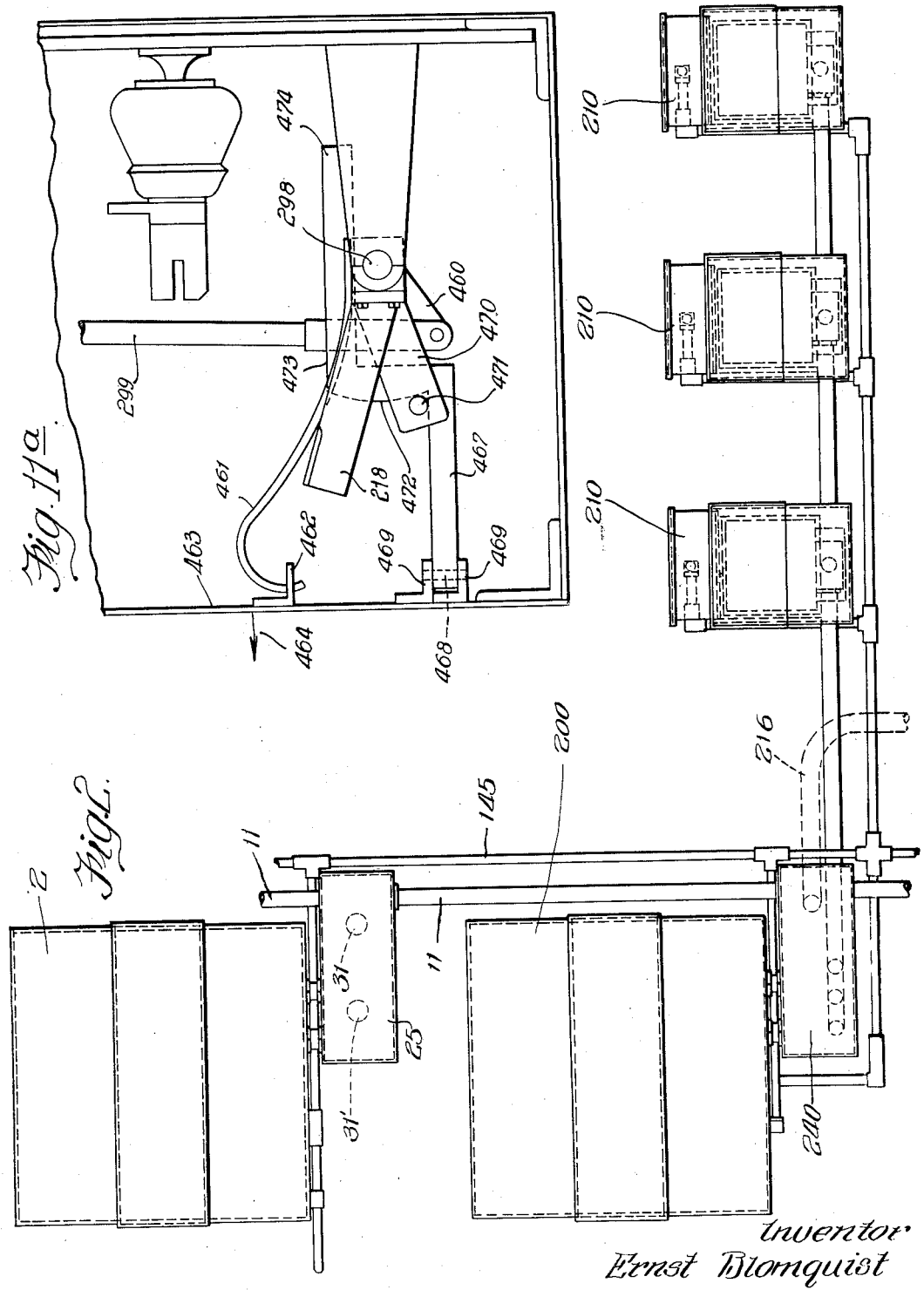

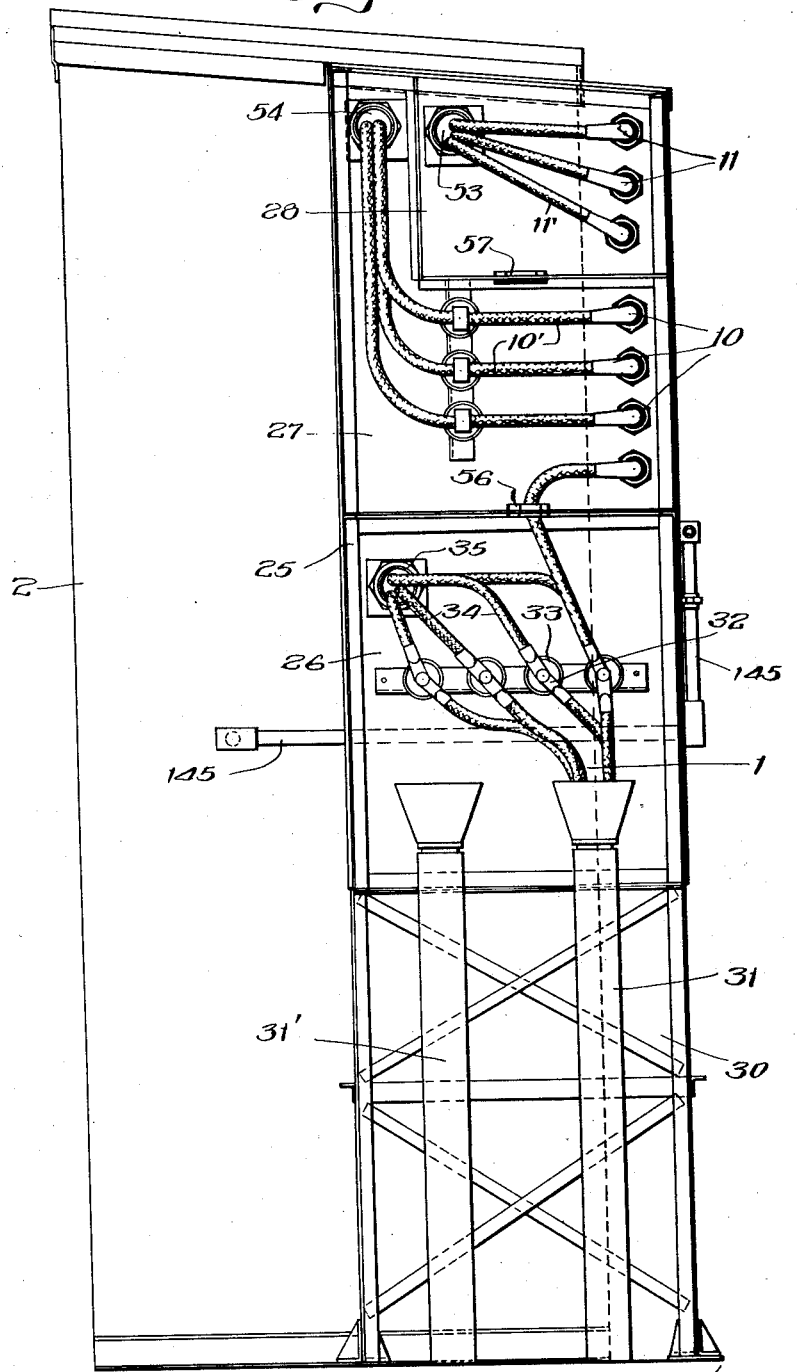

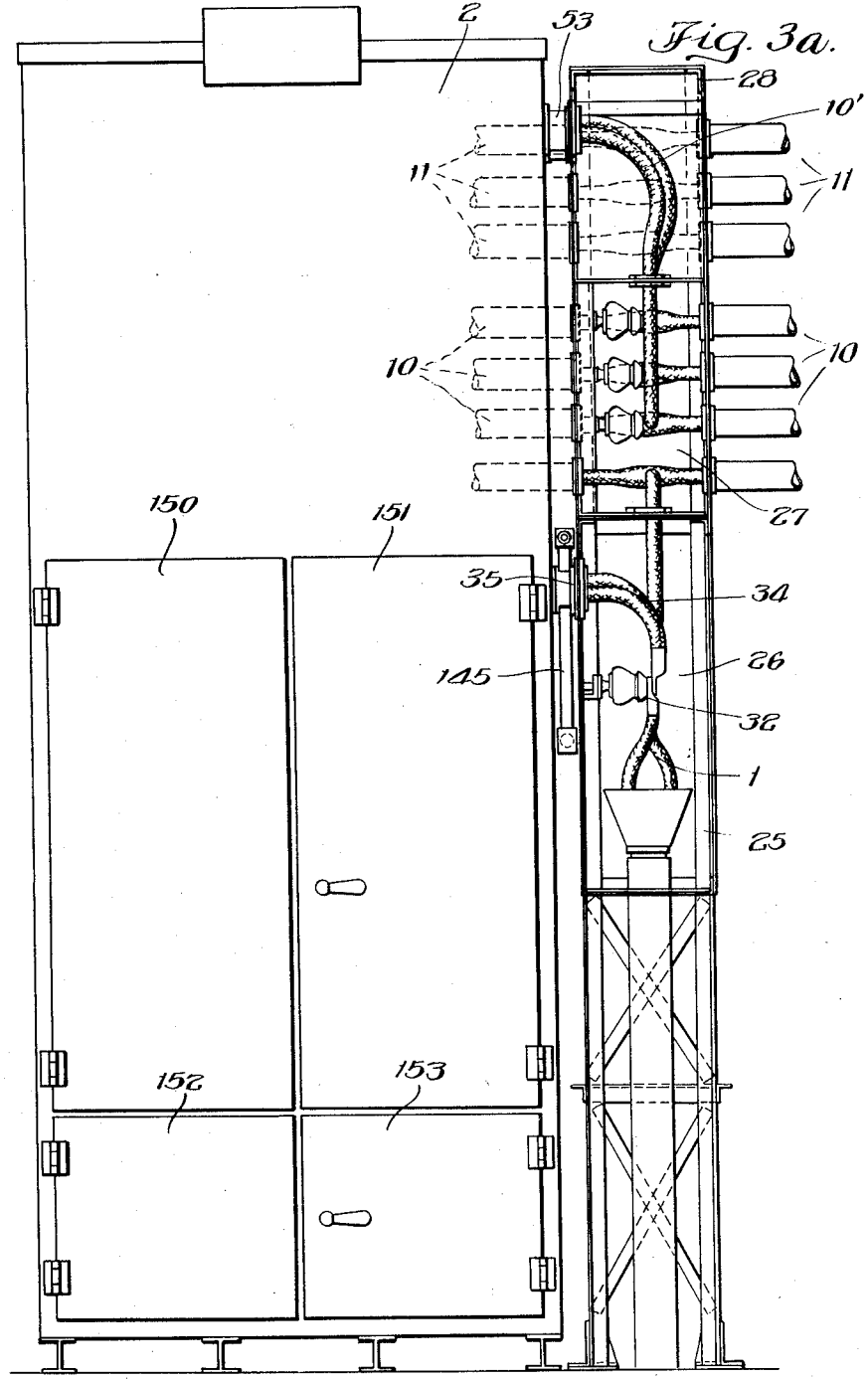

Oct. 10, 1933.        E. BLOMQUIST        1,930,156
SUBSTATION
Filed March 25, 1929        33 Sheets-Sheet 5
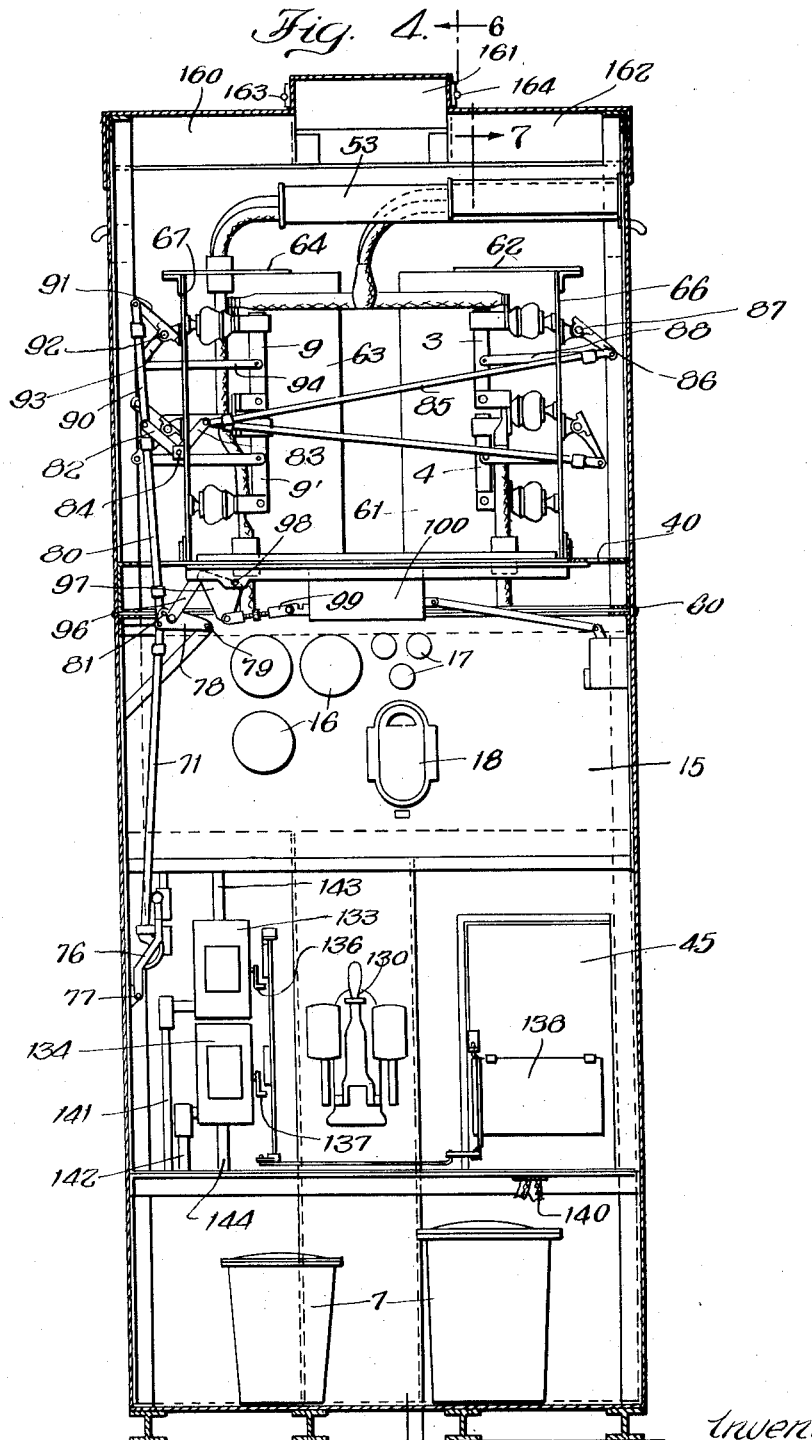

Oct. 10, 1933.  E. BLOMQUIST  1,930,156
SUBSTATION
Filed March 25, 1929   33 Sheets-Sheet 6

Witness
William P. Kilroy

Inventor
Ernst Blomquist
By Brown, Jackson, Boettcher & Dienner
Attys

Oct. 10, 1933.   E. BLOMQUIST   1,930,156
SUBSTATION
Filed March 25, 1929   33 Sheets-Sheet 8

Witness
William P. Kilroy

Inventor
Ernst Blomquist
By Brown Jackson Boettcher Dienner
Attys

Oct. 10, 1933.  E. BLOMQUIST  1,930,156
SUBSTATION
Filed March 25, 1929  33 Sheets-Sheet 9
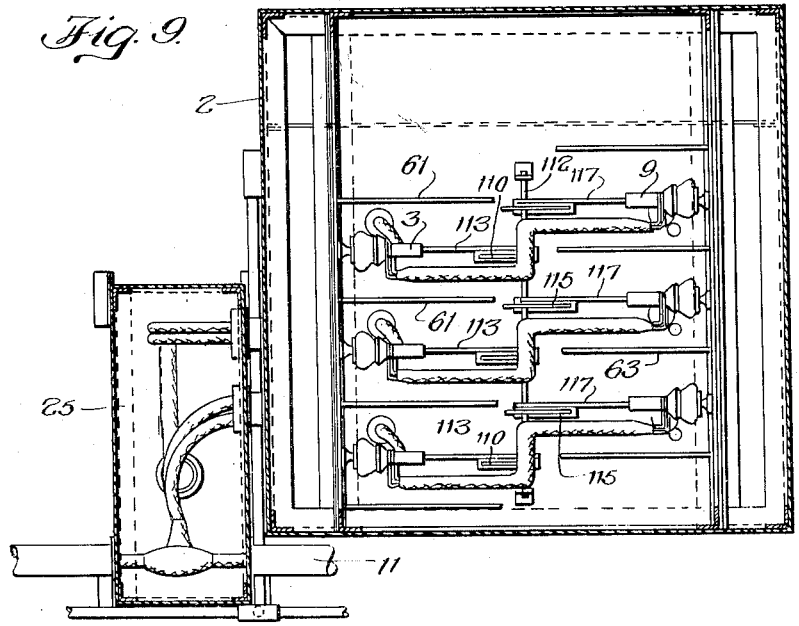
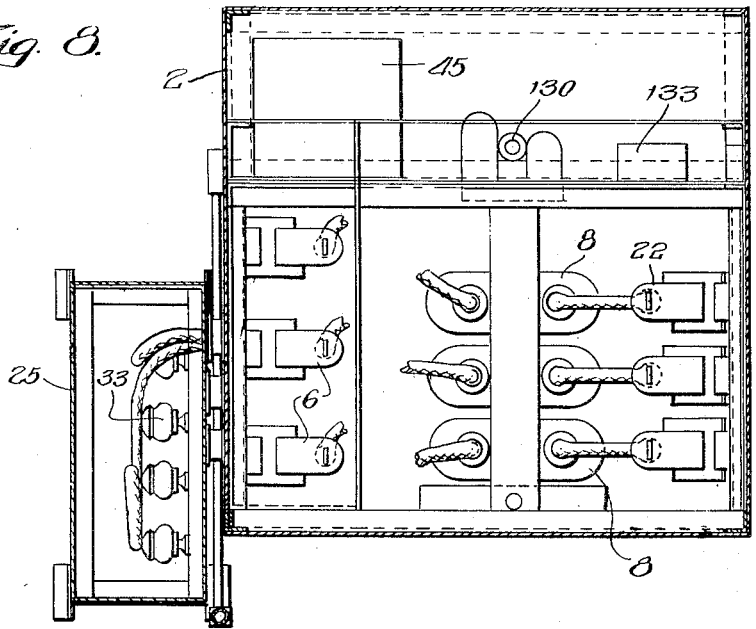
Witness
William P. Kilroy.
Inventor
Ernst Blomquist
By Brown Jackson Boettcher Dienner
Attys.

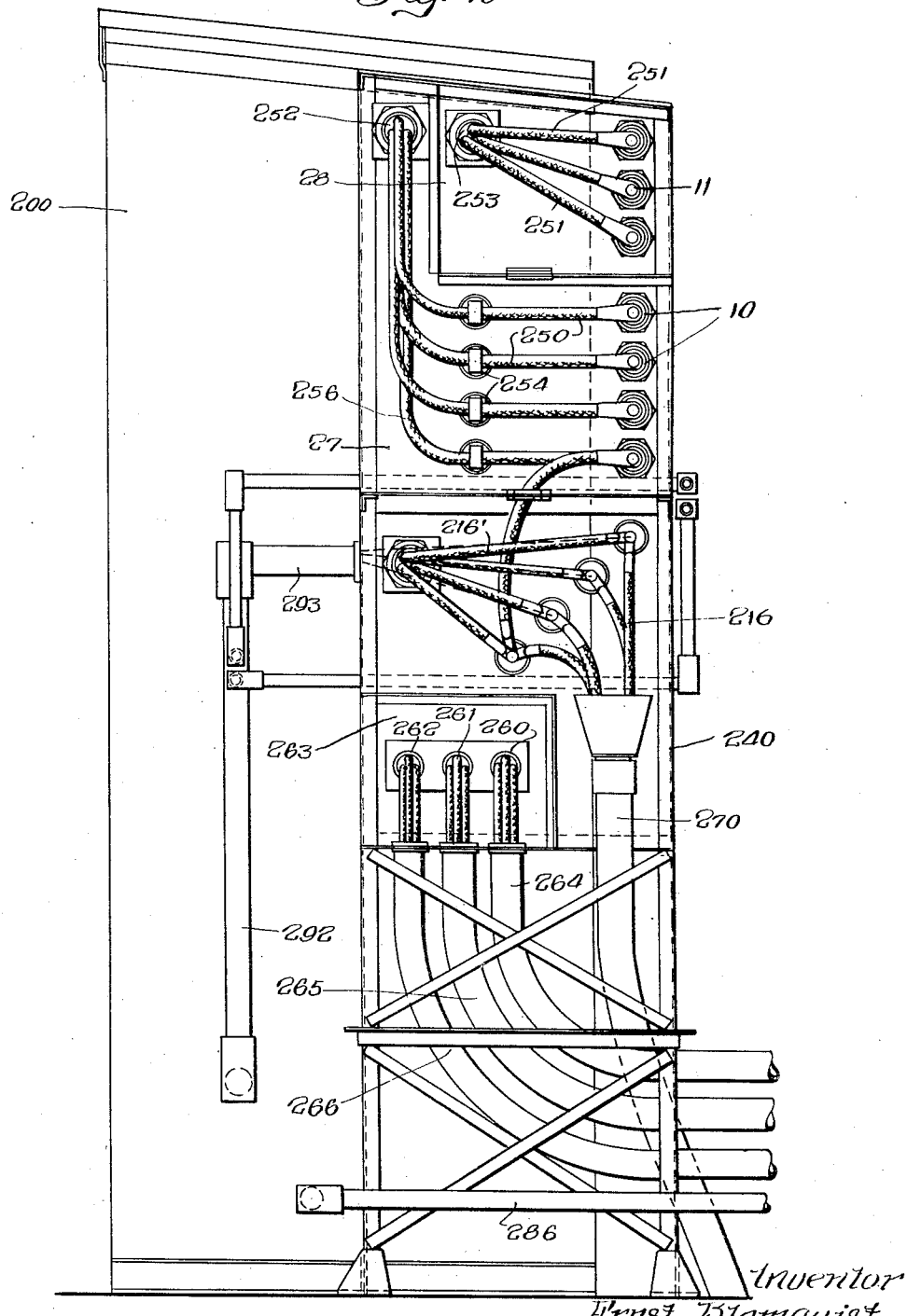

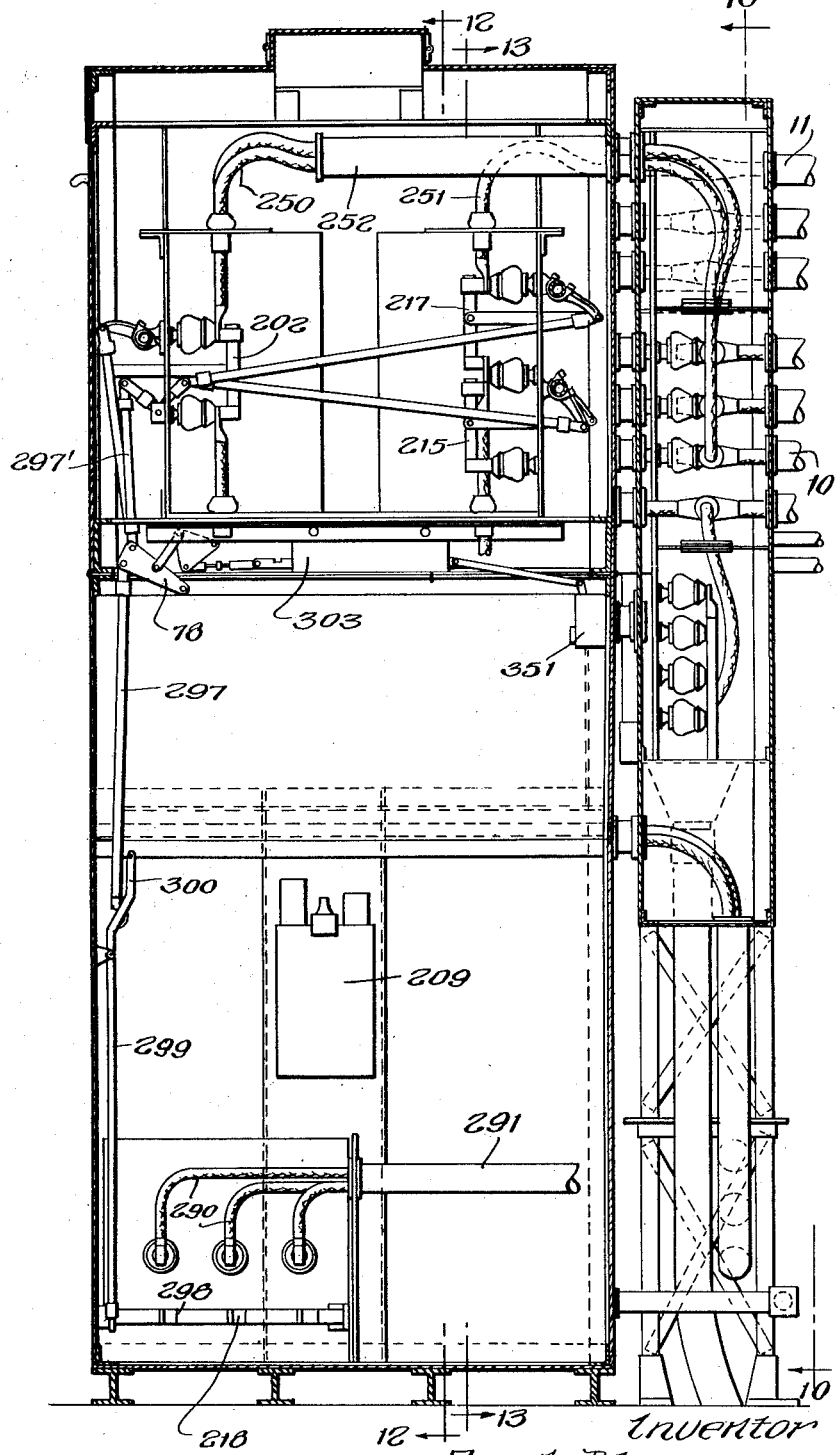

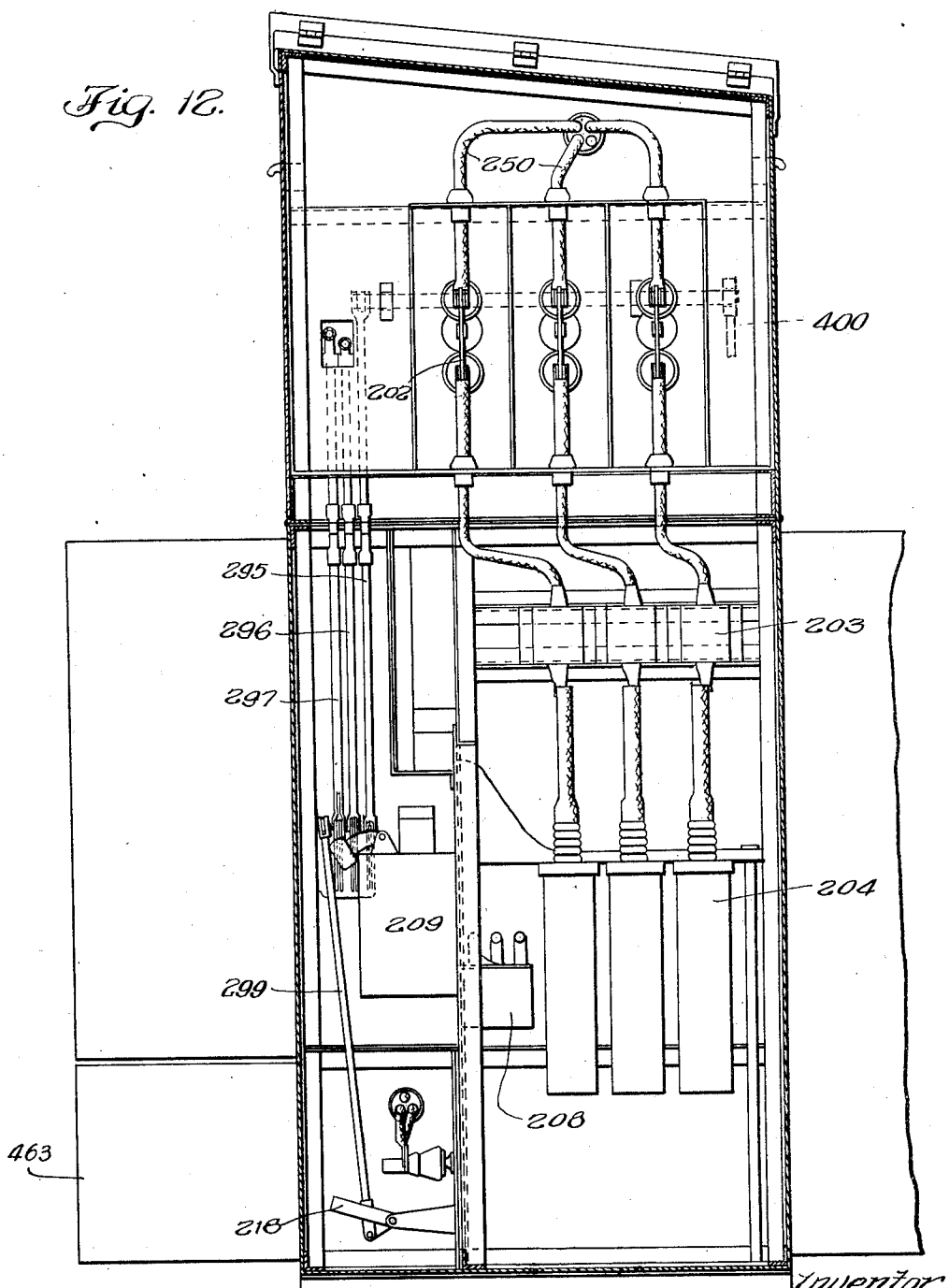

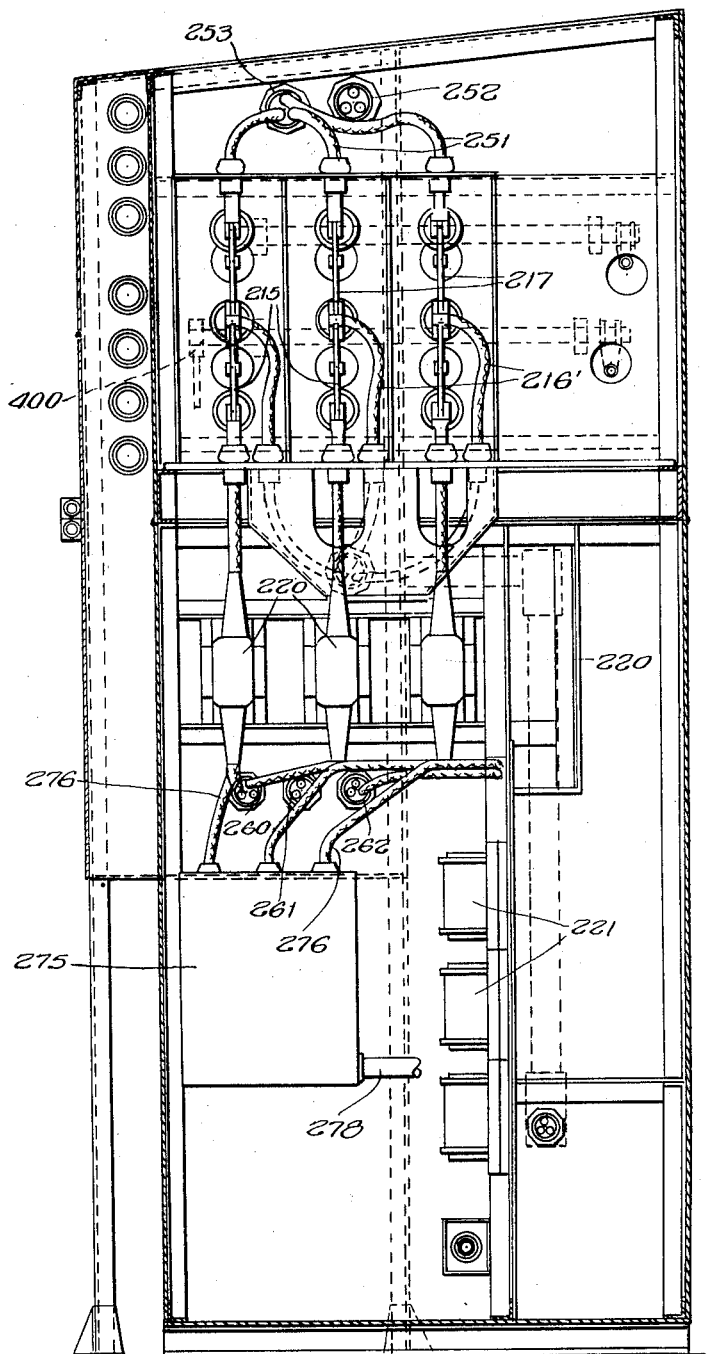

Oct. 10, 1933.    E. BLOMQUIST    1,930,156
SUBSTATION
Filed March 25, 1929    33 Sheets-Sheet 15

Fig. 15
Fig. 17

Witness
William P. Kilroy

Inventor
Ernst Blomquist
By Brown, Jackson,
Boettcher · Dienner
Attys

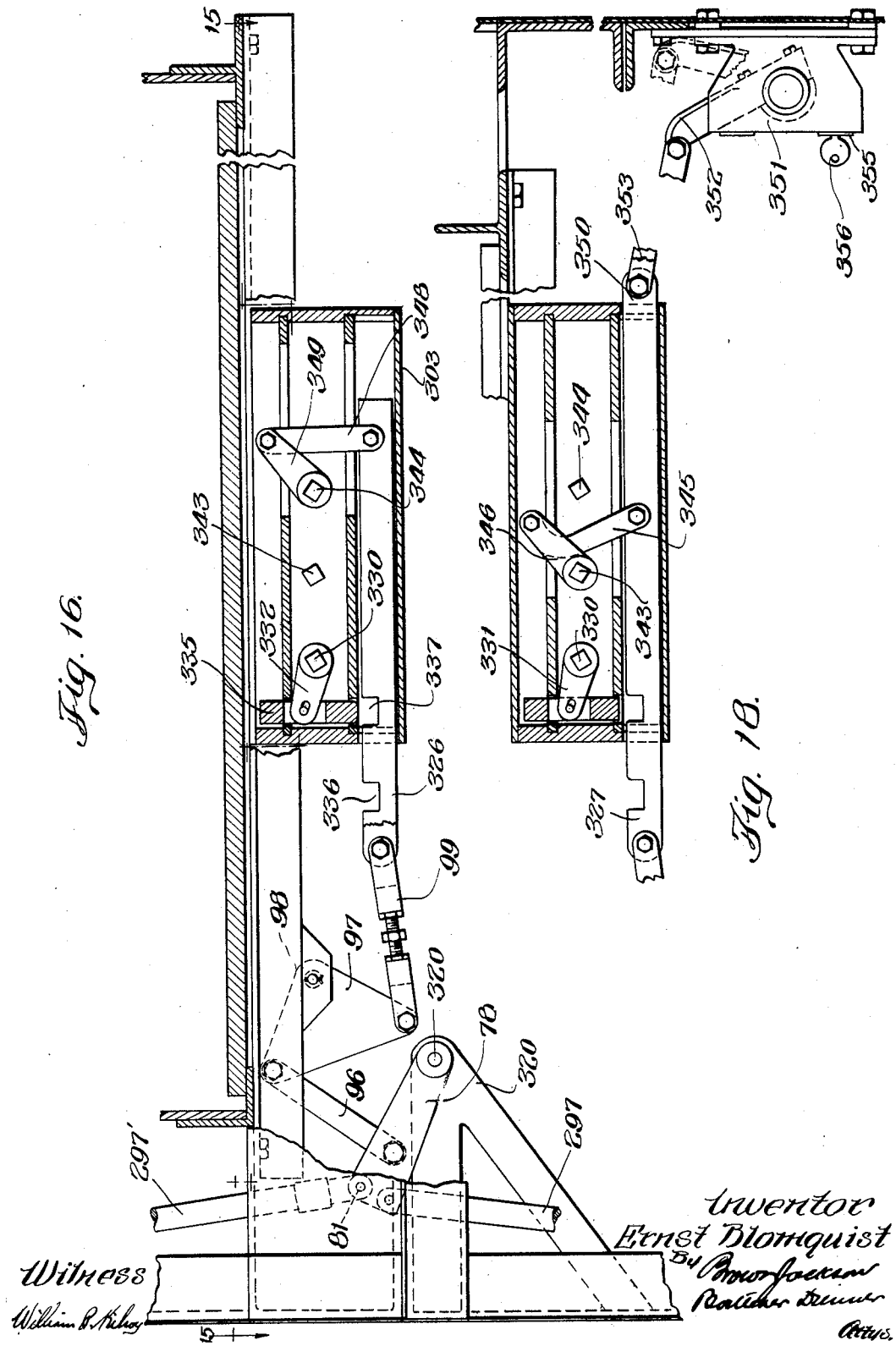

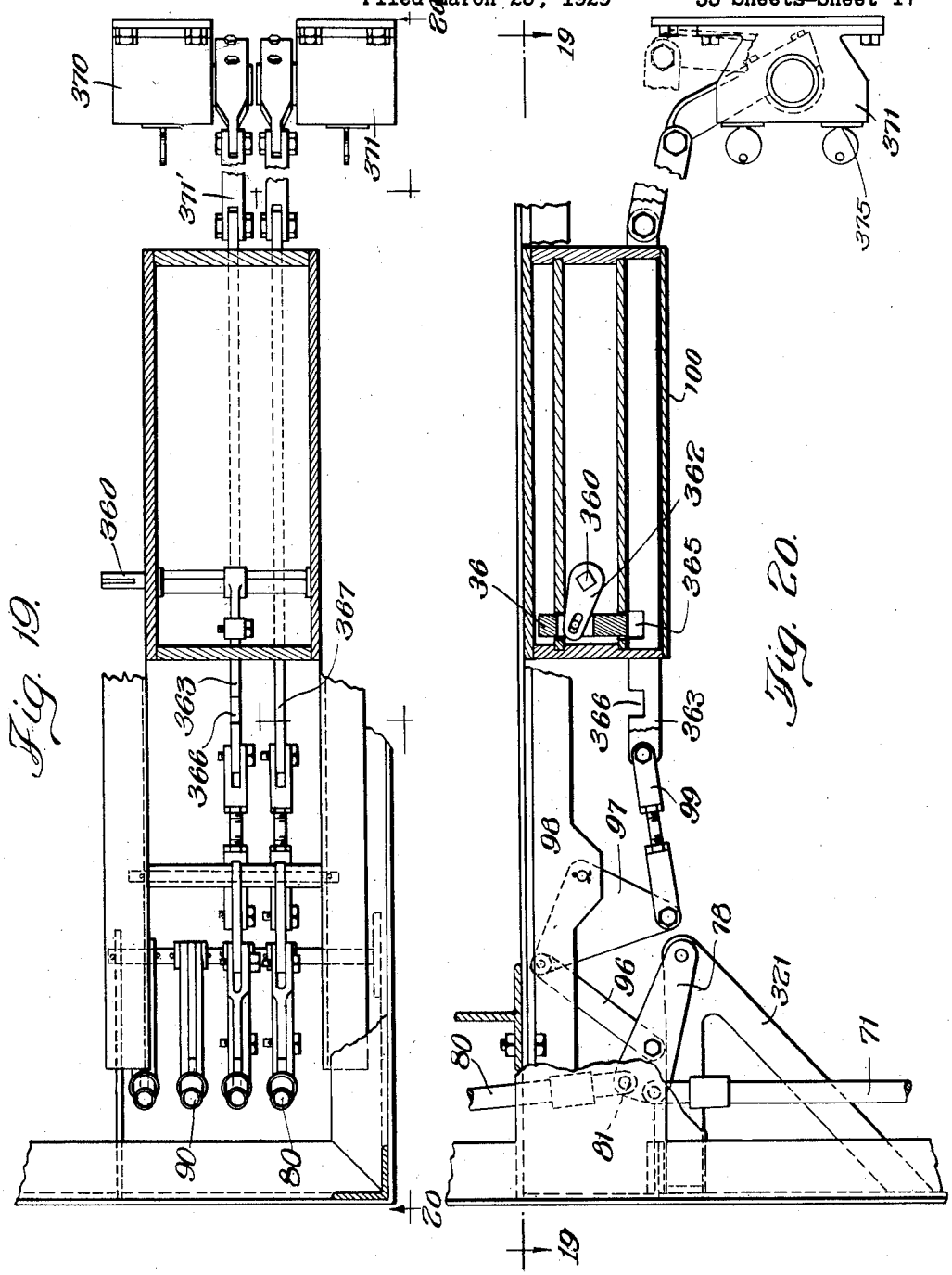

Oct. 10, 1933.  E. BLOMQUIST  1,930,156
SUBSTATION
Filed March 25, 1929  33 Sheets-Sheet 18
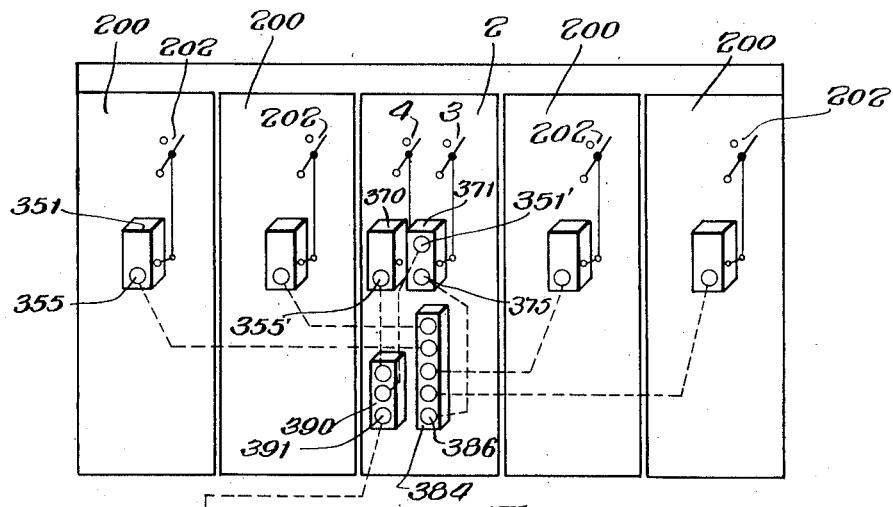
Fig. 21.
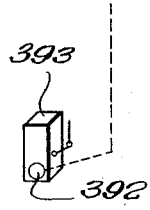
Fig. 22.
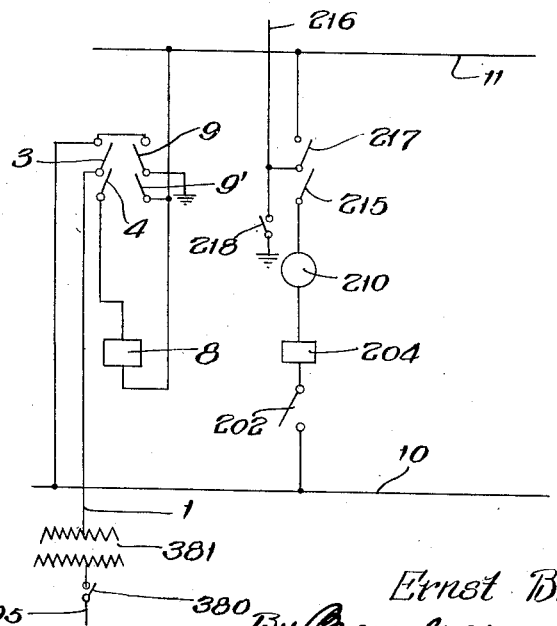
Inventor
Ernst Blomquist Oct. 10, 1933.  E. BLOMQUIST  1,930,156
SUBSTATION
Filed March 25, 1929  33 Sheets-Sheet 19
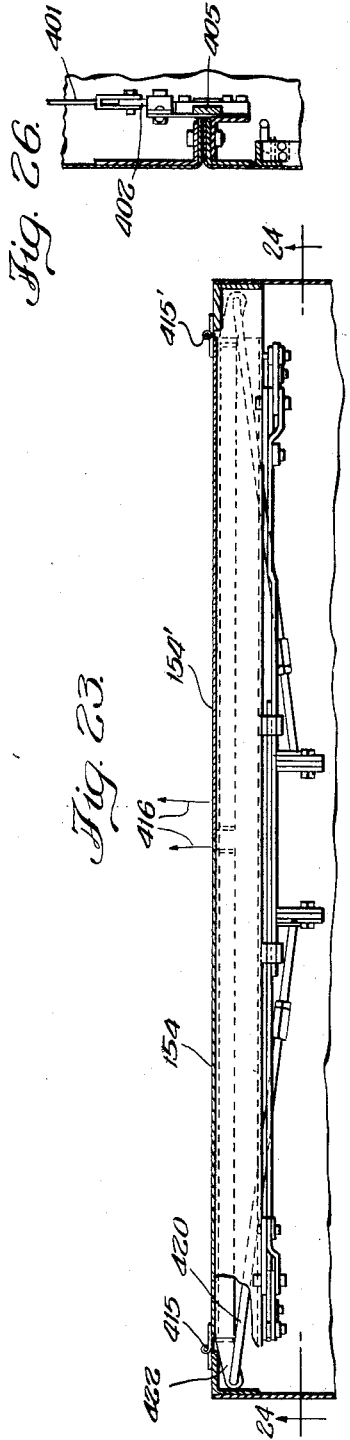
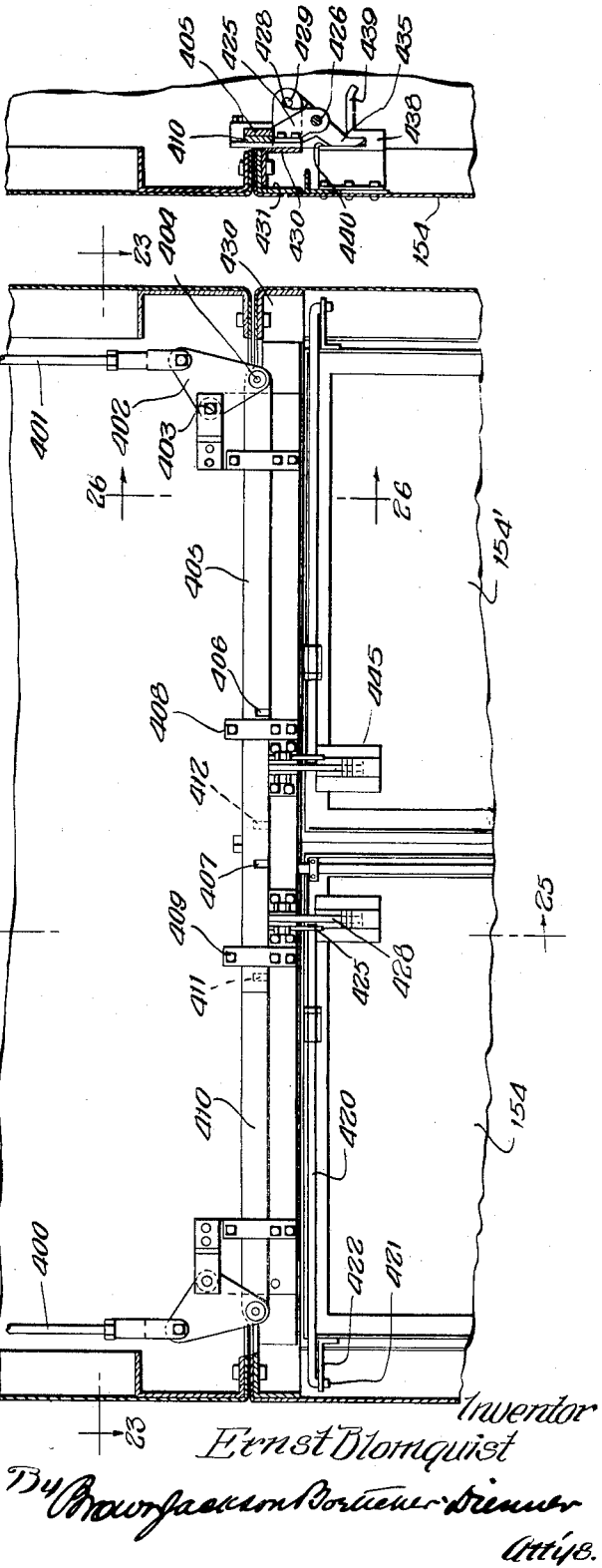

Oct. 10, 1933.   E. BLOMQUIST   1,930,156
SUBSTATION
Filed March 25, 1929   33 Sheets-Sheet 22

Inventor
Ernst Blomquist

Oct. 10, 1933.  E. BLOMQUIST  1,930,156

SUBSTATION

Filed March 25, 1929    33 Sheets-Sheet 23

Witness
William P. Kilroy

Inventor
Ernst Blomquist
By Brown Jackson Boettcher Dienner
Attys

Oct. 10, 1933.  E. BLOMQUIST  1,930,156
SUBSTATION
Filed March 25, 1929  33 Sheets—Sheet 26

Inventor
Ernst Blomquist

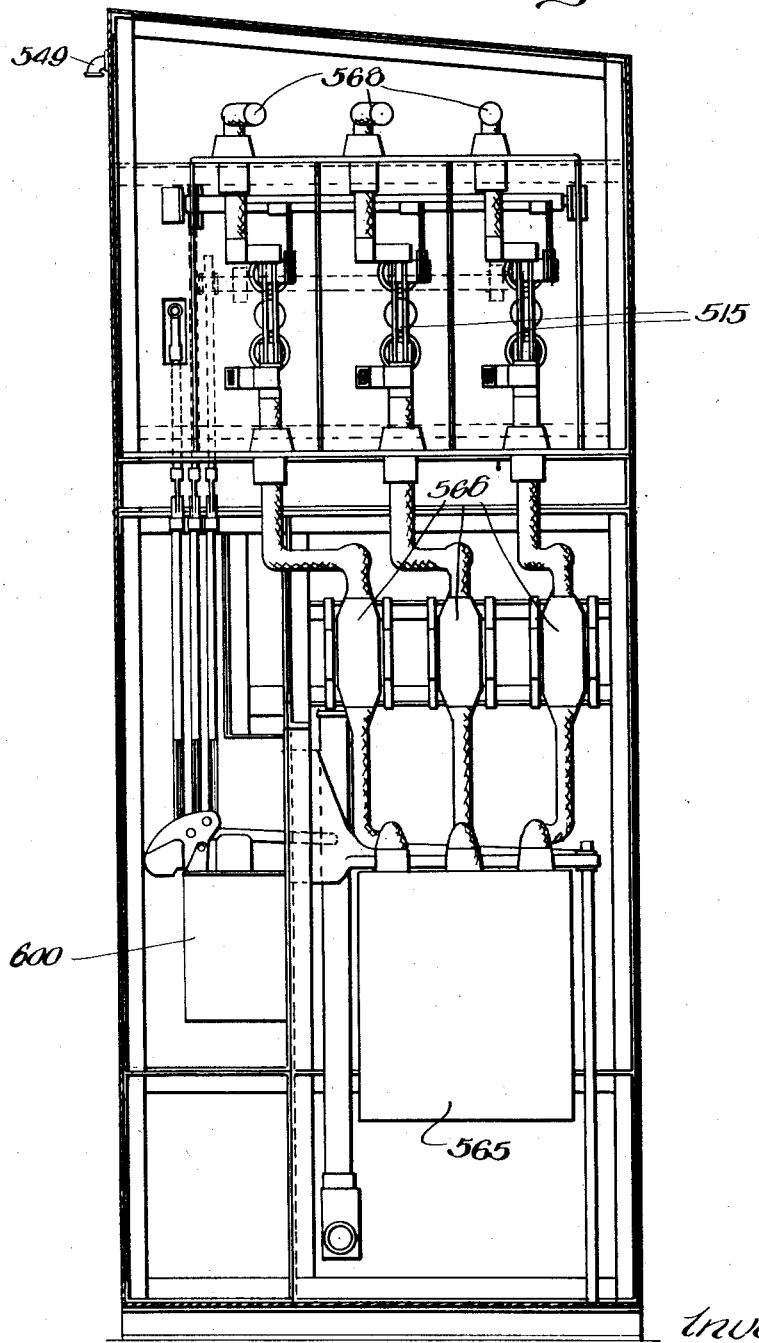

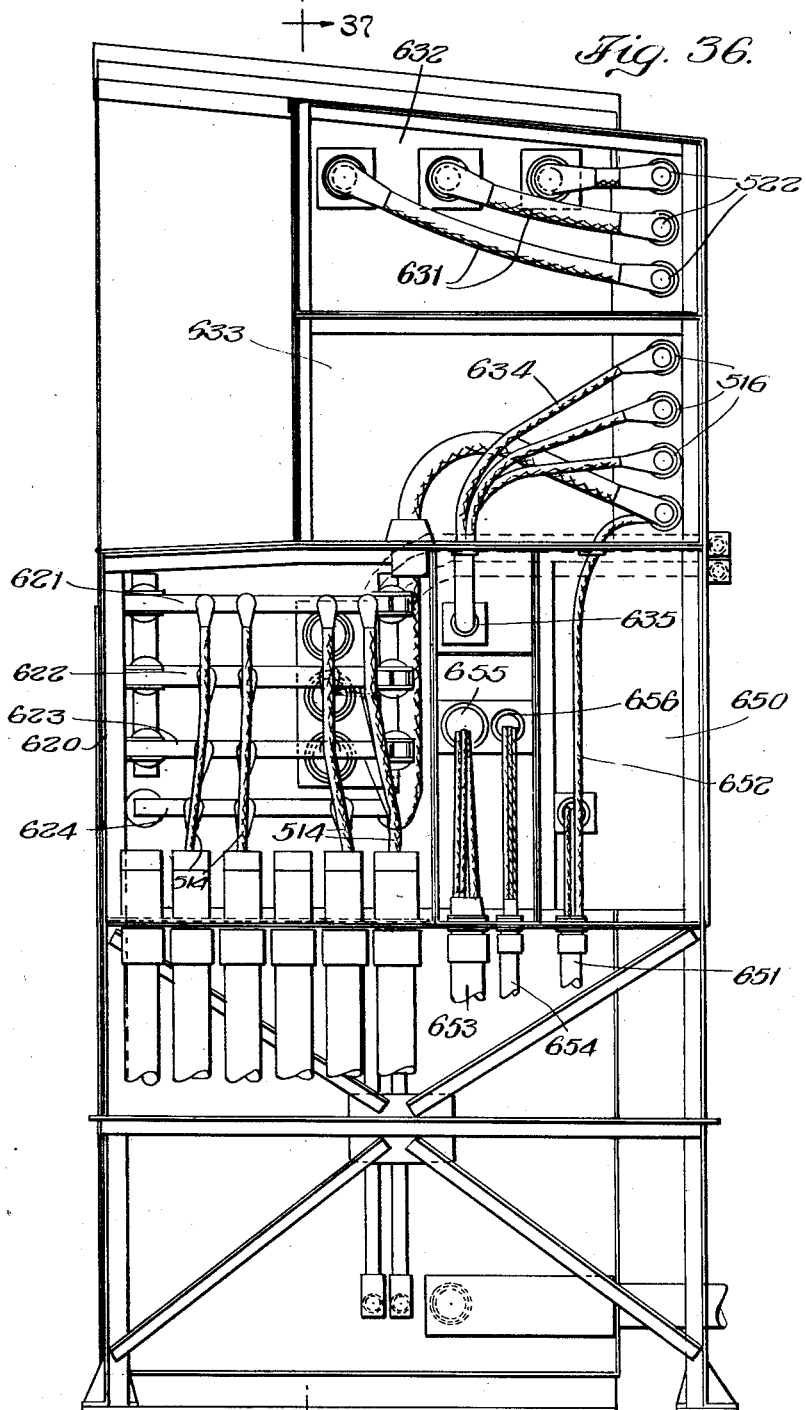

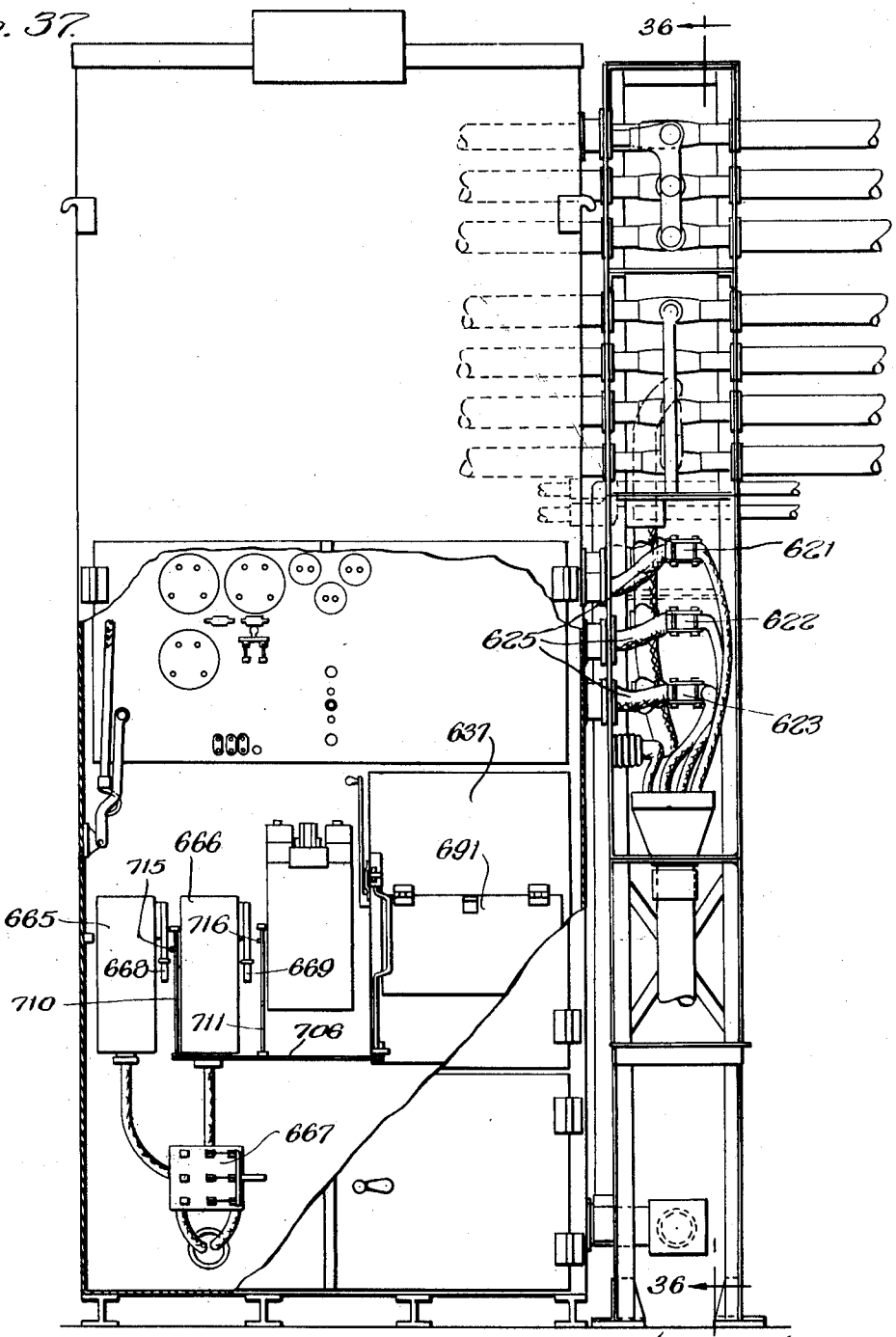

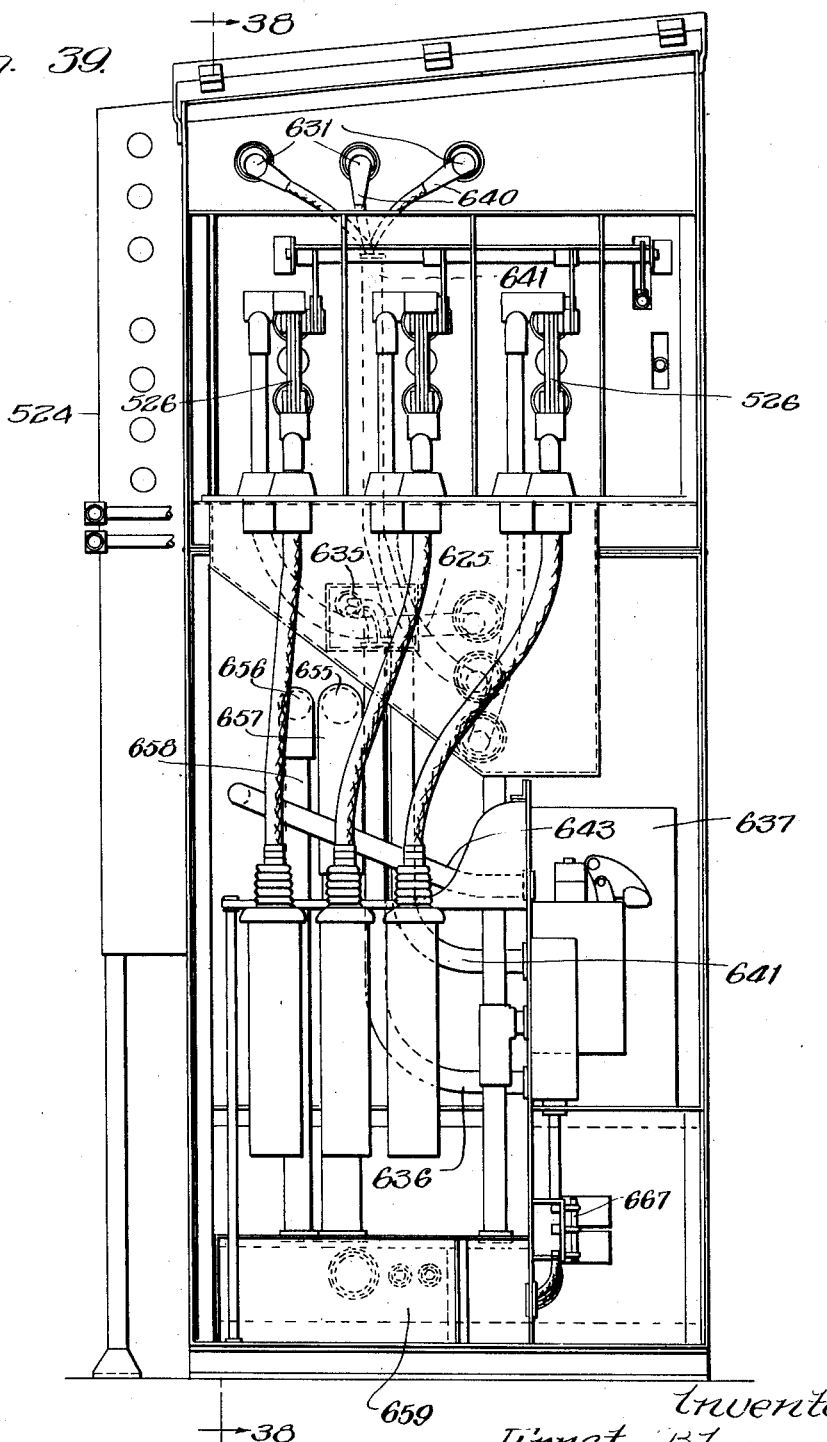

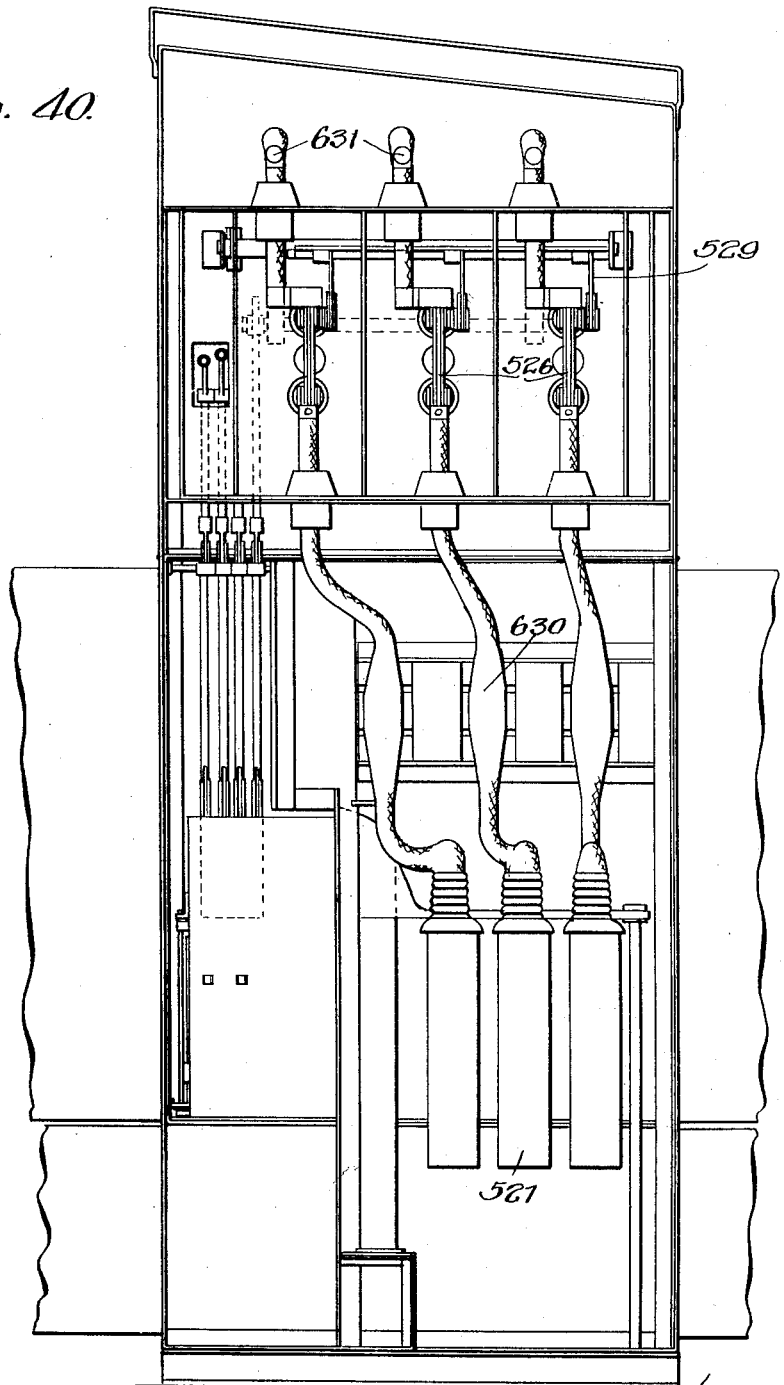

Oct. 10, 1933.          E. BLOMQUIST          1,930,156
SUBSTATION
Filed March 25, 1929          33 Sheets-Sheet 33
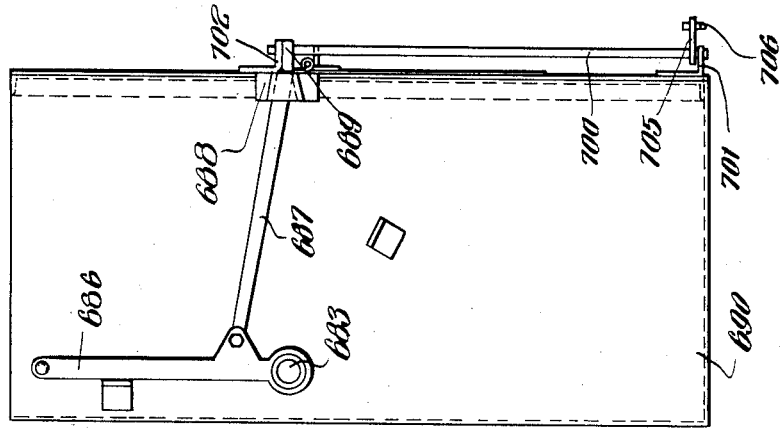
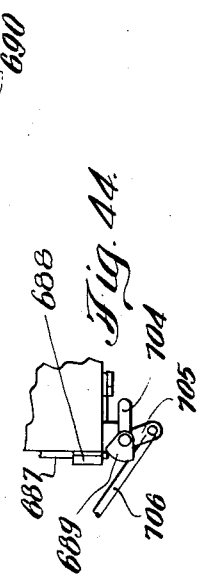
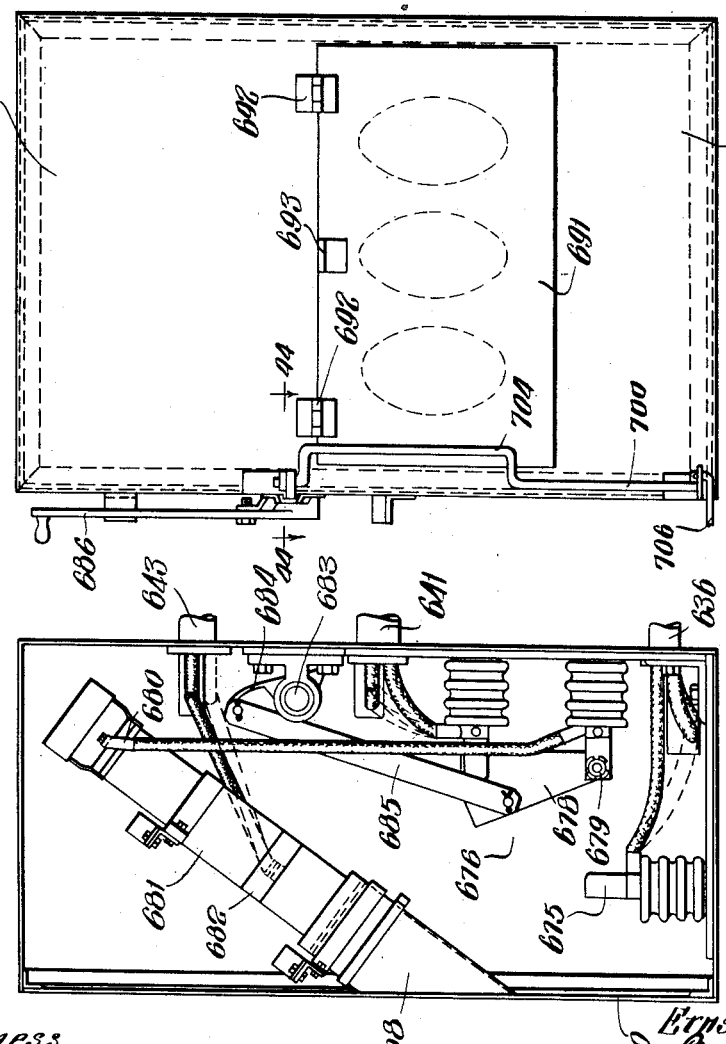
Witness
William P. Kilroy
Inventor
Ernst Blomquist
By Brown Jackson
Boesinger Dienner Attys Patented Oct. 10, 1933

1,930,156

UNITED STATES PATENT OFFICE 1,930,156

SUBSTATION

Ernst Blomquist, Lombard, Ill.

Application March 25, 1929. Serial No. 349,877

24 Claims. (Cl. 175—298)

My invention relates to electrical distribution and more particularly to distributing stations or substations for subdividing regulating measuring and distributing electric power from a source of power to consumers.

The present form of station, while it corresponds in function to the known form of bus and switch stations, has been designed to overcome many of the objections of known devices. I term the present device a distribution center. Its function is to receive electric power as from a remote source of power such as a generating station, step or transform it to a voltage suitable for local distribution if it does not arrive at a suitable distribution voltage, and provide suitable tapping connections or busses from which the feeder lines may be extended all under suitable protection of circuit breakers and with suitable provision for inspection and repair of the various parts and instrumentalities so that continuity of service may be maintained. Suitable regulating or metering equipment is provided and this and all other comparable apparatus is housed and enclosed to render the device simple and safe.

Heretofore outdoor substations for this purpose have generally comprised skeletonized steel framing with the conductors, busses, switches, circuit breakers and the like hung upon the same. Such a station is bulky, unsightly and dangerous.

According to my invention I secure certain advantages over such prior forms of substations among which advantages are the following; more economical construction, increased safety of operation, and saving in the amount of real estate needed for the distribution center.

While the following detailed description and drawings will make clear the manner in which I have secured the above desirable features and advantages, I wish to point out some of the structure and functional distinctions which my invention employs to secure the same.

According to my study of the problem I have concluded that the open or outdoor form of distribution center is highly undesirable and should be eliminated. It must be enclosed by a high type fence to exclude unauthorized access and to prevent children or even careless adults from injuring or destroying themselves by contact with live conductors. Such a structure being extended overhead, where it cannot help being seen, is unsightly and tends to lower rear estate values, particularly in residence districts.

It occupies a larger amount of space than is desirable and usually is not readily capable of extension where an increase in the number of feeders is desired.

I have concluded that if all the live parts and apparatus could be enclosed and where necessary cable or insulated conductors employed instead of bare conductors not only could the center be made more attractive but more compact and less expensive, both as to manufacturing cost and installation expense.

Heretofore the only way to avoid the objectionable and unsightly open air station has been to provide a building constructed of the usual structural parts and subject to all the delays, expenses and objections that apply to buildings. The fixed charges in that case are excessive and unless the station is initially too large it is not capable of supplying an increased demand. I have conceived the idea of constructing of metal suitable housings or enclosures for enclosing the busses, conductors, switches, circuit breakers, measuring or control instruments and the like. Such initial enclosure is capable of quick inexpensive fabrication under factory conditions with machine tools and has the advantage of strength, durability and providing a completely grounded enclosure, of compact design and sightly appearance.

Where the capacity of one of such housings is passed by the demand for lines another such housing and its associated parts may readily be provided and installed.

My invention provides also an improved dead end construction suitable for use in conjunction with this or any other distribution center.

It is a further object of the present invention to provide interlocks between the switches within any switch house and also between the switches and certain of the doors of the switch house so as to prevent inadvertent operation of the disconnect switches when they should not be operated, and to prevent access to certain parts of the switch house when the conductors in those parts are alive. Interlocks are also provided between the doors and the various switch houses so as to prevent opening certain of the switch houses through which current may be fed back from other portions of the system until the connections at the other switch houses are such that this is not possible. In addition, the door to the fuse cabinet is interlocked with the switches of the rest of the system to prevent opening of the doors while the line is alive. By this arrangement it is not possible to remove a fuse until the circuit through the fuse has been opened at another point. The same applies with respect to inserting a fuse. The interlock arrangement is such as to render the station practically foolproof.

Recognizing that it is sometimes possible for a switch operating mechanism to be actuated without actually operating all of the switch blades, due to a broken link, I provide signal flags in conjunction with the switch blades of the disconnect switches to indicate the open or closed position of the individual blades, thereby preventing accidents from occurring on that score. The disconnect switches are mounted in separate compartments so that if it should happen that one is destroyed by an arc, the arc cannot be communicated to the other switches, nor can the arc nor the molten metal injure the operator.

The disconnect switches are mounted as close together as is consistent with a high degree of safety, and I provide a novel switch, or an attachment for known switches, that will enable repairs to be made with a high degree of safety upon one end of the switch, when the same is open, even though the other end of the switch is alive. The novel feature of my disconnect switch comprises a hood of suitable insulating material which, when the switch is open, entirely encloses the stationary or live terminal of the switch, thereby permitting work to be done adjacent the switch without fear of accidentally touching the live contact.

It is a further object of the present invention to provide a novel and improved fuse holder whereby the fuses used in the circuit may be readily inserted or removed with safety, the arrangement being such that the fuse cannot possibly be inserted with the wrong end up. The fuse is arranged to be removed by hand, being mounted on an insulator which is removed therewith. A grounded metal shelf is provided adjacent the hand gripping portion so that should the interlocks fail and should an operator be able to remove the fuse when the circuit through it is alive, the operator himself will not be injured.

The attainment of the above and further objects of the present invention will be apparent from the following specification taken in conjunction with the accompanying drawings forming a part thereof.

In the drawings:

Figure 1 shows in diagrammatic form a wiring diagram of the distribution center;

Figure 2 is a plan view of the distribution center;

Figure 3 is a side elevation of the totalizing metering switch house bus connecting cabinet with the end plates removed;

Figure 3a shows a front view of the totalizing metering switch house and bus conecting cabinet, the cover of the bus connecting cabinet being removed;

Figures 4 to 9 are sections of the totalizing metering switch house wherein

Figure 4 is a front view with the doors open and the front section of the upper portion of the switch house removed;

Figure 5 is a similar view showing the rear of the switch house;

Figure 6 is a sectional view taken along the line 6—6 of Figure 4;

Figure 7 is a sectional view taken along the line 7—7 of Figure 4;

Figure 8 is a sectional view taken along the line 8—8 of Figure 5;

Figure 9 is a sectional view taken along the line 9—9 of Figure 5;

Figure 10 is a side elevation of the bus connecting cabinet for the feeder switch house, said view being taken substantially along the line 10—10 of Figure 11;

Figure 11 is a front view of the feeder switch house with the front wall removed;

Figure 11a is a fragmentary view showing the interlock between the grounding switch in the switch house shown in Figure 11 and the lower front door of that switch house;

Figure 12 is a view taken along the line 12—12 of Figure 11;

Figure 13 is a view taken along the line 13—13 of Figure 11;

Figure 15 is a plan elevation of the interlock mechanism within the feeder switch house, said view being taken substantially along the line 15—15 of Figure 16;

Figure 16 is a sectional view taken along the line 16—16 of Figure 15;

Figure 17 is a sectional view taken along the line 17—17 of Figure 15;

Figure 18 is a view taken along the line 18—18 of Figure 15;

Figure 19 is a plan elevational view of the interlock mechanism in the totalizing metering switch house, said view being taken along the line 19—19 of Figure 20;

Figure 20 is a section taken along the line 20—20 of Figure 19;

Figure 21 is a diagrammatic layout of the "Cory" interlocks between the switch houses of the distribution center;

Figure 22 is a simple single line diagram of the circuit of the distributing center;

Figure 23 is a plan elevation of the rear door interlocks in the feeder switch house, being a view taken along the line 23—23 of Figure 24;

Figure 24 is a section taken along the line 24—24 of Figure 23;

Figure 25 is a fragmentary section taken along the line 25—25 of Figure 24;

Figure 26 is a fragmentary section taken along the line 26—26 of Figure 24;

Figure 34 is a section taken along the line 34—34 of Figure 32;

Figure 36 is a side elevation of the transfer switch house bus connecting cabinet, said view being taken along the line 36—36 of Figure 37;

Figure 37 is a view taken along the line 37—37 of Figure 36; the front portion of the transfer switch house being broken away to show the interior thereof;

Figure 39 is a sectional view taken along the line 39—39 of Figure 38;

Figure 40 is a section taken along the line 40—40 of Figure 38;

Figure 41 is a side view of the fuse box on the primary side of the station light and power transformers, the cover of the box being removed;

Figure 42 is a front view of the fuse and switch box shown in Figure 41;

Figure 43 is a side view of the same switch box, said view being taken from the side opposite that shown in Figure 41; and Figure 44 is a fragmentary section taken along the line 44—44 of Figure 42.

Figure 5:
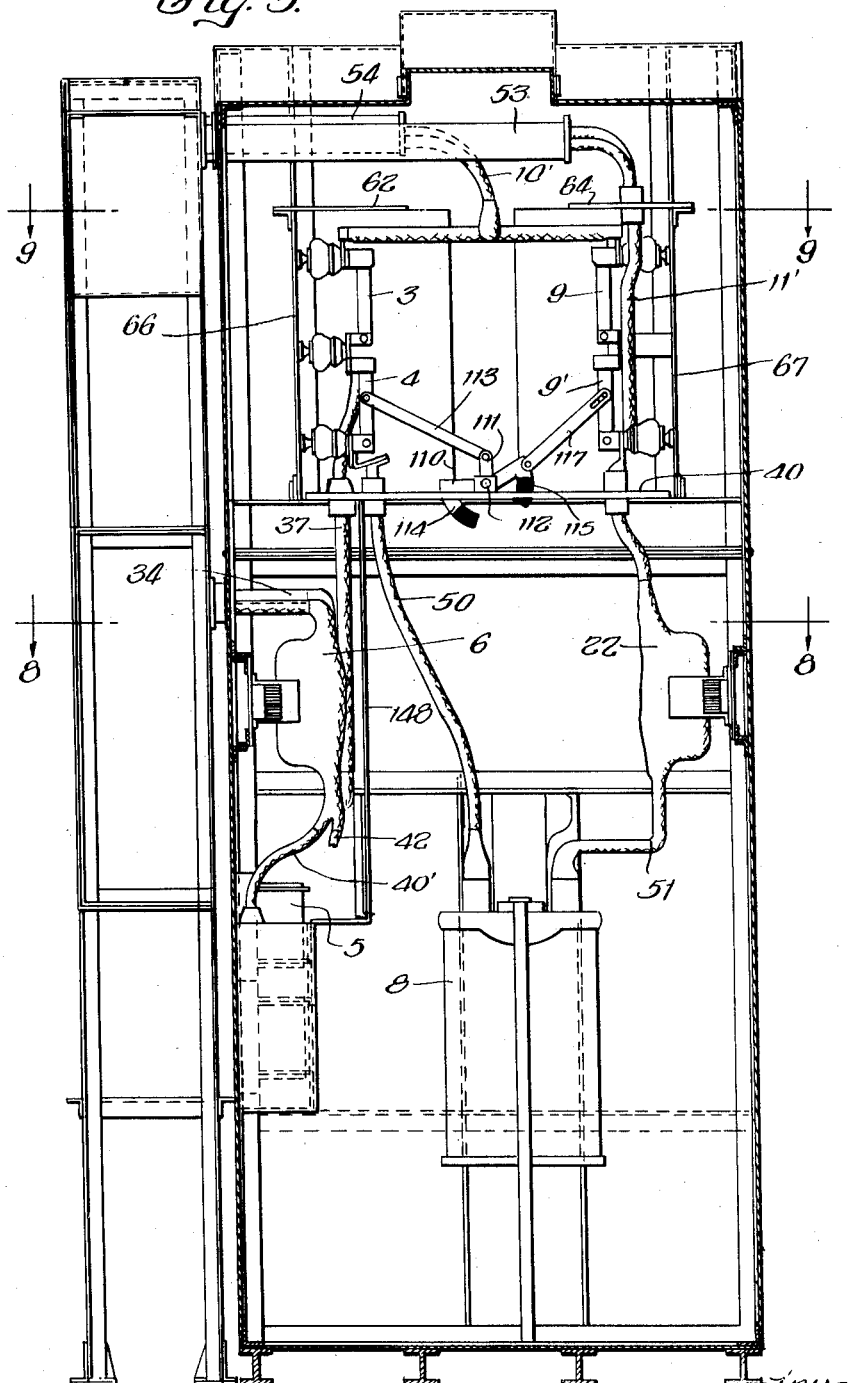

In order to facilitate an understanding of the arrangement of parts within the switch houses, and the function of the various parts, reference may be had to Figure 1 showing, in diagrammatic form, a circuit diagram of the connections in the totalizing metering switch house and in one of the feeder switch houses. The three conductors indicated at 1 extend to the switch house 2 from the secondary or low voltage side of a transformer bank (not shown). The primary side of the transformer bank is fed from a high voltage transmission line, the transformers stepping the voltage down to suitable distribution values which, in the present case, may be assumed to be in the neighborhood of 4,000 volts, although the present invention is not limited to any particular value of the voltage, and the voltage of the incoming conductors 1 may be at any value desired. The incoming line 1 extends to the junction of the main disconnect switches 3 and the transfer bus disconnect switches 4. Potential measuring transformers 5 and current measuring transformers 6 are connected to the line 1 ahead of the disconnect switches 3 and 4 so that the current and voltage of the line is measured regardless of whether the switches 3 or the switches 4 are closed. Station light and power transformers 7 are connected to the incoming line 1 ahead of the disconnect switches 3 and 4 and beyond the current transformers 6 to furnish the necessary potential for light and power needed at the switching station.

The main bus disconnect switch 3 connects the line 1 directly to the main bus 10 whereas the transfer bus disconnect switch 4 connects the incoming line 1 to the transfer bus 11 through a circuit which extends through an oil circuit breaker indicated at 8. A main bus grounding switch 9 and a transfer bus grounding switch 9' are provided for grounding the main and the transfer busses, respectively, when necessary. An instrument panel, indicated at 15, is mounted within the switch house and has mounted thereon three cut-out relays 16, three ammeters 17, a demand watt-hour meter 18, as well as a few incidentals such as a light 19 for illuminating the instruments, a switch 20 for closing a circuit to the light and a number of testing terminals indicated at 21. The relays 16 are actuated by the respective current coils 22 and when any one of the three relays 16 is energized, thus indicating an overload in the current transformer 22 of the corresponding phase, it completes a circuit to the tripping coil of the oil circuit breaker 8. Fuses 25 are provided on the high tension side of the station light and power transformers 7 and fuses 26 are provided in the primary side of the potential measuring transformers 5. Fuses 27 are likewise provided on the low tension side of the station light and power transformers 7.

The station light and power transformers 7 are connected both on the primary and on the secondary side in open delta and step down the voltage from a value such as 4,000 volts to a suitable value such as 220 volts. The 220 volt side furnishes the station power and a tap off is taken from the midpoint of the secondary of one of the transformers 7 to furnish power to the 110 volt line for station lighting purposes.

The main and transfer busses extend in single conductor conduits which are preferably of aluminum or other nonmagnetic material, to the various switch houses. One of the switch houses is shown at 200 in Figure 1. The main and transfer busses 10 and 11 extend through a bus connecting cabinet which will be presently described, and there connections are made to the busses. The conductors 201 that are connected to the main bus 10 extend to a main bus disconnect switch 202 from which the conductors extend to an oil circuit breaker 204. Current transformers 203 for causing the actuation of the oil circuit breaker 204 are mounted between the switches 202 and the oil circuit breaker. The other poles of the oil circuit breaker are connected to the three regulators which are located outside of the switch house. There are three conductor conduits each extending to one of the regulators. Each of the conduits contains one of the three conductors 205, a return conductor 206, and a neutral conductor 207 that carries the regulator magnetizing current.

The three conductors 207 carrying the magnetizing current from the three regulators extend to the neutral through an oil switch indicated at 208. The oil switch 208 is operated from the same mechanism that operates the oil switch 204, said mechanism being indicated at 209. The three conductors 206 each extend from one of the conduits leading from the regulators 210, through a regulator disconnect switch 215 to the outgoing feeder 216. A transfer bus disconnect switch indicated at 217 is provided for establishing a connection between the feeder 216 and the transfer bus 11 independent of the regulators and the oil circuit breakers within the switch house 200. A grounding switch 218 is provided for grounding the feeder when necessary. The current transformers 220 and the potential transformers 221 furnish the current and voltage for controlling the potential regulators, the power for actually actuating the regulators being furnished from the station light and power conductors indicated at 222, the current from the transformers 220 and from the transformers 221 merely controlling the regulators. The regulators are actuated in the usual manner and maintain the potential of the outgoing feeder substantially constant. Fuses 225 are provided in the primary side of the potential transformers 221.

The mechanism 209 for operating the oil circuit breaker is of the automatic reclosing type which when opened by a short circuit recloses two or three times, and if the short circuit still persists, it remains open. The usual timing mechanism 230 for controlling the mechanism 209 is mounted upon the switch board panel 231. A knife switch indicated at 233 is provided for opening the circuit to the timing mechanism 230 when desired, thus disabling the timing mechanism and preventing an automatic reclosure of the circuit breaker once the same opens due to a short or a ground on the line. Three cut-out relays indicated at 234 are mounted upon the panel 231 and are each controlled by one of the current transformers 203. Upon the energization of any one of the three relays 234, indicating an overload on the corresponding phase conductor of the line, a circuit is completed for the tripping coil of the switch operating and tripping mechanism 209. The station ground conductor 241 extends throughout the switch house 200 as well as throughout the switch house 2 and connections to ground are made through it. A neutral conductor likewise extends in a conduit parallel and adjacent to the conduits housing the main bus 10.

It is to be noted that when the feeder 216 is connected to the main bus, it is connected in circuit with the oil circuit breaker 204 within the switch house 200. When the feeder is connected to the transfer bus its circuit does not extend through an oil circuit breaker within the switch house 200. It is, however, to be noted that the oil circuit breaker 8 within the totalizing metering switch house 2 is connected between the incoming line conductors 1 and the transfer bus 11 so that the oil circuit breaker 8 is included in the circuit of the feeders when the feeders are being energized over the transfer bus.

Reference may now be had to Figure 2, showing a plan view of the layout of the totalizing metering switch house and of the feeder switch house, and of the regulators. The switching center will contain only one totalizing metering switch house, such as the switch house 2, and may contain any number of feeder switch houses, such as the switch house 200, depending upon the size of the distribution center. There is one feeder switch house 200 for each feeder outgoing from the switching center. The switch house 2 has a bus connecting cabinet 25 located adjacent thereto an the incoming line conductors 1 (Figure 1) enter the bottom of the bus connecting cabinet through a conduit indicated at 31. A similar conduit 31' is provided for receiving line conductors, such as the conductors 1, upon the future expansion of the switching center.

Connections from the line conductors 1 extend into the switch house 2 and after passing through the various switches, as indicated in Figure 1, they extend back into the bus connecting cabinet 25. The switch house will be further described as the specification proceeds. The busses 10 and 11 extend outward from the bus connecting cabinet 25 in single conductor conduits which are preferably of nonmagnetic material, such as aluminum, in order to reduce the losses that would otherwise be present due to induction. Since the bus conduits are one above the other, only the topmost conduit 11 may be seen in Figure 2. The station light and power conductors are contained in the conduit 145. The switch house 200 is located in line with the switch house 2 and another switch house 200 may be located on the other side of the totalizing metering switch house 2. All of the switch houses are preferably in alignment and they each include a cabinet, similar to the cabinet 25, adjacent the switch house 2. The main and transfer busses extend through the bus connecting cabinets of the various switch houses and connections to those busses are made within the cabinet. Those connections extend into the switch house and after passing through the various switches within the switch house extend back to the bus connecting cabinet.

The feeder 216 extends from the bus connecting cabinet 240 preferably underground. The conductors between the switch house 200 and the three regulators 210 for that switch house are preferably enclosed in conduits.

Reference may now be had to Figures 3 to 9, inclusive, showing the totalizing metering switch house and the bus connecting cabinet therefor.

The bus connecting cabinet, shown more particularly in Figures 3 and 3a, comprises a rectangular sheet metal casing 25 having a lower section 26 and an upper section 27. The upper section comprises the bus compartment, and is subdivided into two compartments, the upper compartment 28 being the transfer compartment and the lower compartment being the main bus compartment. The cabnet 25 is supported by an open steel framework 30 and is located adjacent to the totalizing metering switch house 2. A conduit 31 extends into the lower section 26 of the bus connecting cabinet extending the line conductors 1 into the cabinet. The conduit contains four conductors, one for each phase of the system, which is assumed to be a three phase system, and the fourth, which is a neutral conductor. A similar conduit 31' extends into the switch house, that conduit being provided for an additional line should the future load of the distribution center increase to such a point as to necessitate the installation of a larger transformer bank to replace the one previously installed.

This is provided solely for future expansion. The four conductors from the conduit 31 terminate at four insulator supported clips 32 supported upon insulators 33. Conductors 34 are connected one to each of the terminal clips 32 and extend from the bus connecting cabinet through a conduit 35 into the switch house.

Figure 7:
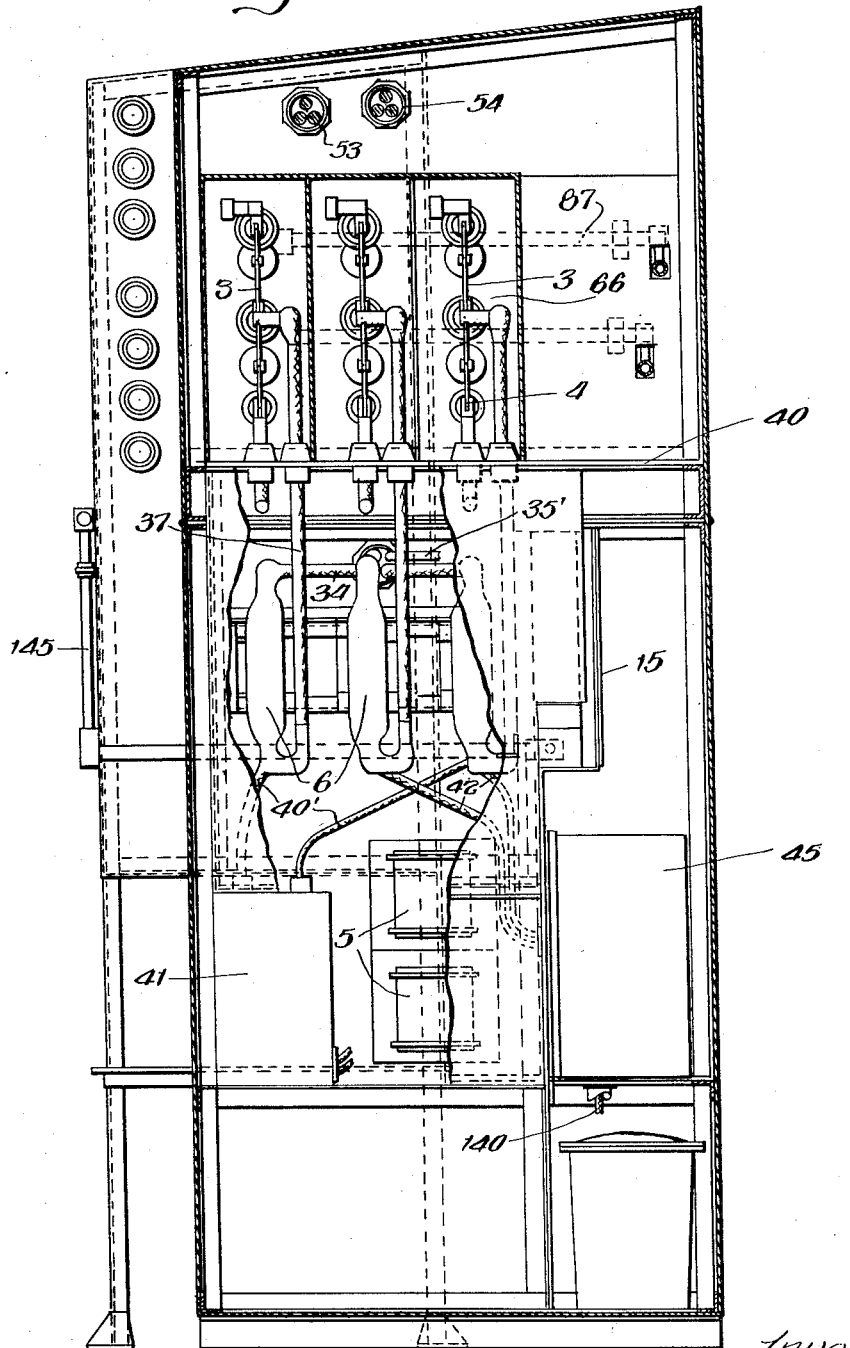

Within the switch house three of the four conductors 34 extend to the three current transformers 6 (Figures 5 and 7) and the fourth, indicated at 35' in Figure 7, extends to the neutral point of the potential transformers and from there to the station light and power transformer neutral. The conductors 34 extend through the current transformers 6 and from the current transformers extend upward, as indicated at 37, to the lower terminal of the switch 3. It may be noted at this point that the switch house 2 is divided into two sections by a partition 40 and that the disconnect switches are all mounted in the upper section whereas the transformers for metering and for station light and power purposes, as well as the oil circuit breaker and the various fuses, are all mounted in the lower section of the switch house, below the partition 40. Conductors 40' extend from two of the three phase conductors 37 adjacent the current transformers 6 to the fuse cabinet 41.

The fuse cabinet 41 houses the fuses 26 that are in the primary side of the metering potential transformers 5, seen more particularly in Figure 1. Similar conductors 42 extend from the conductors 37 adjacent the power transfomers 6 to the fuse cabinet 45 wherein the fuses 25 (Figure 1) in the primary side of the station light and power transformers are mounted.

A conductor 50 extends from the lower terminal clip of each of the transfer bus disconnect switches 4 to one side of the oil switch 8, (Figure 5), a conductor 51 extending from the other side of the oil circuit breaker 8 through the current transformers 22 to the lower terminal clip of the grounding switch 9' in the upper section of the switch house. Conductors 11' extend from the same terminal clip to the conduit 53 from whence they extend into the bus connecting cabinet where they are connected to the transfer bus 11. In a like manner three conductors, indicated at 10' in Figure 5, extend from the upper terminal clip of the main bus disconnect switches 3 into the conduit 54 which extends to the bus connecting cabinet. In the bus connecting cabinet the conductors 10' are connected to the main bus. A conductor likewise connects the upper terminal clip of the disconnect switches 3 with the terminal clip of the grounding disconnect switches 9. The lower terminal clips of the switches 9 are electrically connected with the upper terminal clips of the switches 9' and are connected to the station ground.

The conduits 53 and 54 extend to the bus connecting cabinet, as may be seen more clearly in Figure 3a. Three conductors 10 and a fourth neutral conductor extend through the bus connecting cabinet, said conductors constituting the main bus. Each of the conductors is enclosed in a separate conduit, the conduits being preferably of a non-magnetic material such as aluminum, for instance, in order to eliminate any losses that might otherwise be present due to the alternating magnetic field. The conductors 10' within the compartment 27 are connected to the busses 10 in a suitable manner. As shown in the drawings, the conductors are spliced together. The conductors 10 representing the main bus extend through the bus connecting cabinet and onward to the cabinets of the various switch houses, as previously pointed out. The transfer busses 11 likewise extend through the cabinet and up to and through the bus connecting cabinets of the various switch houses. Within the compartment 28 in the bus connecting cabinet the conductors 11' extending from the conduit 53 are spliced or otherwise suitably secured to the busses 11. The nipple 56 between the main bus compartment 27 and the section 26 of the cabinet shown in Figure 3 is large enough to permit the passage of four conductors of the size of the conductors 10'. An additional nipple 57 is provided between the sections 27 and 28 of the cabinet. By this arrangement it is possible to extend connections from the line 1 directly to the main or to the transfer bus should it become necessary or desirable to cut out the totalizing metering switch house entirely.

The totalizing metering switch house is made up in two sections in order to facilitate the shipment of the switch house. The two sections are bolted or otherwise suitably secured together at 60, as indicated in Figure 4.

The disconnect switches are all mounted in the upper section which is separated from the lower section by a partition 40, as previously stated. The partition is made of suitable fire resisting and electrical insulating material, such as asbestos, for instance. The main bus disconnect switches 3 and the transfer bus disconnect switches 4 of the respective phases are separated from one another by suitable transit barriers 61, so that an arc at the disconnect switches of any one phase cannot be communicated to the other phases. Similar transit barriers at the top of the switches, as indicated at 62, prevent an arc which may be generated at one of the disconnect switches from extending to the main or the transfer busses above. The grounding switches 9 and 9' of the respective phases are likewise separated by suitable transit barriers 63 and a similar barrier 64 is placed above the switches to prevent an arc from being extended upward to the transfer busses. The disconnect switches 3—4 are mounted upon panels 66 and the switches 9 and 9' are mounted on panels 67. The switches 3, 4, 9 and 9' are operated by the switch operating rods 71, 72, 73 and 74, respectively. As may be seen in Figure 4, the operating lever 71 has pivoted to it a handle 76 which in turn is pivoted at 77 to the frame of the switch house. Downward movement of the handle causes a downward movement of the lever 71 with the result that the link 78, which swings about the stationary pivot 79, is swung downward.

The link 78 has an operating lever 80 pivoted at 81 directly to it so that upon downward movement of the link the lever 80 is moved downward. A bell crank lever having arms 82 and 83 is pivoted at 84, and the lever 80 is pivoted to the arm 82 so that upon downward movement of the lever 80 the arm 82 of the bell crank lever is swung downward, with the result that the operating rod 85 which is pivoted to the arm 83 of the bell crank lever is actuated. The other end of the operating rod 85 is connected to a crank 86 which is keyed to a rotatable shaft 87. The operating rod 85 thereby causes a rotation of the shaft 87. The shaft 87 extends along the rear of all three main bus disconnect switches 3, as may be seen in Figure 7, and has a crank similar to the crank 86 secured to it at the rear of each of the switches. A lever 88 of bakelite or other suitable insulating material is connected to each of the last mentioned cranks and upon rotation of the shaft 87 those cranks actuate the levers 88 and thereby cause the opening or closing of the switch blades 3. The transfer bus disconnect switches 4 are operated in the same manner as are the switches 3, the operating lever 72 (Figure 6) operating those switches. The switches 9 and 9' are likewise operated in much the same manner, differing therefrom only that in the case of the switches 9 and 9' the operating rod 85 and the bell crank levers 82—83 are omitted. In the case of the switch 9, a lever 90 corresponding to the lever 80 and pivoted to a link corresponding to the link 78 is pivoted to a crank arm 91 which is rigidly secured to a rotatable shaft 92 that extends at the rear of the three grounding switches 9.

Separate cranks 93 are secured to the rotatable shaft 92 at the rear of each of the three switches 9 and operate the levers 94 which is pivoted to the cranks 93 and to the respective switch blades 9. The levers 94 actuate the switches 9. It is, of course, understood that the three switches 9 as well as the three switches 3 are operated each by three levers 94 and 88, respectively.

There are four links, such as the link 78 of Figure 4, and each of the switch levers 71, 72, 73 and 74 is pivoted to one of the links 78. To each of the links 78 there is pivoted a separate connecting link 96 which in turn is pivoted to a triangular plate 97 which is pivoted to the stationary structure at 98. From each of the plates 97 there extends a link 99 to the interlock mechanism 100. The interlock mechanism is mechanically connected to the oil circuit breaker 8 (Figure 5) in a manner to be more fully set forth hereafter and interlocks the disconnect switches with the oil circuit breaker so that the disconnect switches cannot be operated except in a certain relationship with respect to one another and with respect to the circuit breaker. It is apparent that if the link 99 extending into the interlock mechanism is held against movement it will effectively hold the plate 97 against movement and likewise the link 96. This will effectively prevent movement of the link 78 and thereby prevent movement of the operating lever 71 for operating the disconnect switches.

Although the positions of the handles that operate the levers 71 to 74 generally indicate the open or closed position of the disconnect switches this is not always the case. It may happen that one of the levers 71 to 74 is operated to move the corresponding group of disconnect switches to the open or closed position, and, due to a broken link, such as the links 94 or 88, one of the three switch blades that was to have been operated upon the actuation of the lever is not operated. Under these conditions one or more conductors in the lower section of the switch house may be alive whereas they should be dead. Since an operator attempting to make repairs in the lower section of the switch house cannot see the disconnect switches, it is apparent that if one of the switch blades of the switch 3 is relied upon as being open whereas it is actually closed or, if the grounding switch blades 9' are relied upon as being closed whereas one of the blades is actually open, then it may be dangerous for an operator to be making alterations or repairs in the lower section of the switch house. To remove this possible source of trouble signal flags are provided for indicating, in the lower section of the switch house, the open or closed positions of each of the switch blades 4 and of the individual switch blades 9'. These signal flags are indicated in Figures 5 and 9, and reference may be had to those figures of the drawings for a more complete disclosure of the same.

Individual signalling means is provided for indicating the open or closed position of each of the three switch blades of the transfer bus disconnect switch 4. The signalling means for each blade comprises a lever having two arms at right angles to one another indicated at 110 and 111 and pivoted at 112. The arm 111 is connected to one of the blades of the disconnect switch 4 by means of a link 113 made of bakelite or other suitable insulating material. An arcuate arm 114 is formed integral with the member 110 and extends through a slot in the partition 40 between the upper and lower compartments into the lower compartment. The lower portion of the arcuate arm 114 is painted red to indicate danger. When the switch blade 4 is closed the red portion of the arcuate member 114 is exposed to view in the lower section of the switch house whereas when the blade 4 is swung to the open position the lever arm 110 swings in a clockwise direction about the pivot 112 and draws the arcuate arm 114 out of the lower section of the switch house so that the red flag portion of the arm is not visible from the lower section of the switch house. The appearance of the red flag portions of the arms 114 indicates to an operator that the corresponding blades of the disconnect switch 4 are closed and the operator is thereby warned not to commence making any alterations or repairs until those blades are opened.

Each of the blades of the grounding disconnect switch 9' is likewise provided with signal flags for indicating its open or closed position. The signalling flags for the grounding disconnect switches comprise arcuate arms 115 similar to the arms 114, likewise painted red at their lower ends and likewise pivoted at 112. The lever 117 connecting the blades 9' with the signalling means is connected directly to the arcuate arm 115 instead of through an arm corresponding to the arm 111. When the switch blade 9' is moved to the open position, the red flag 115 is displayed, whereas when the switch blade is moved to the closed position the red flag is withdrawn into the upper compartment of the switch house. The grounding switch 9' is provided as a safety measure to insure a grounding of the conductors within the lower section of the switch house when alterations or repairs are to be made and if the grounding switch is open, the operator is apprised of the fact by the presence of the red flags.

Figure 6:
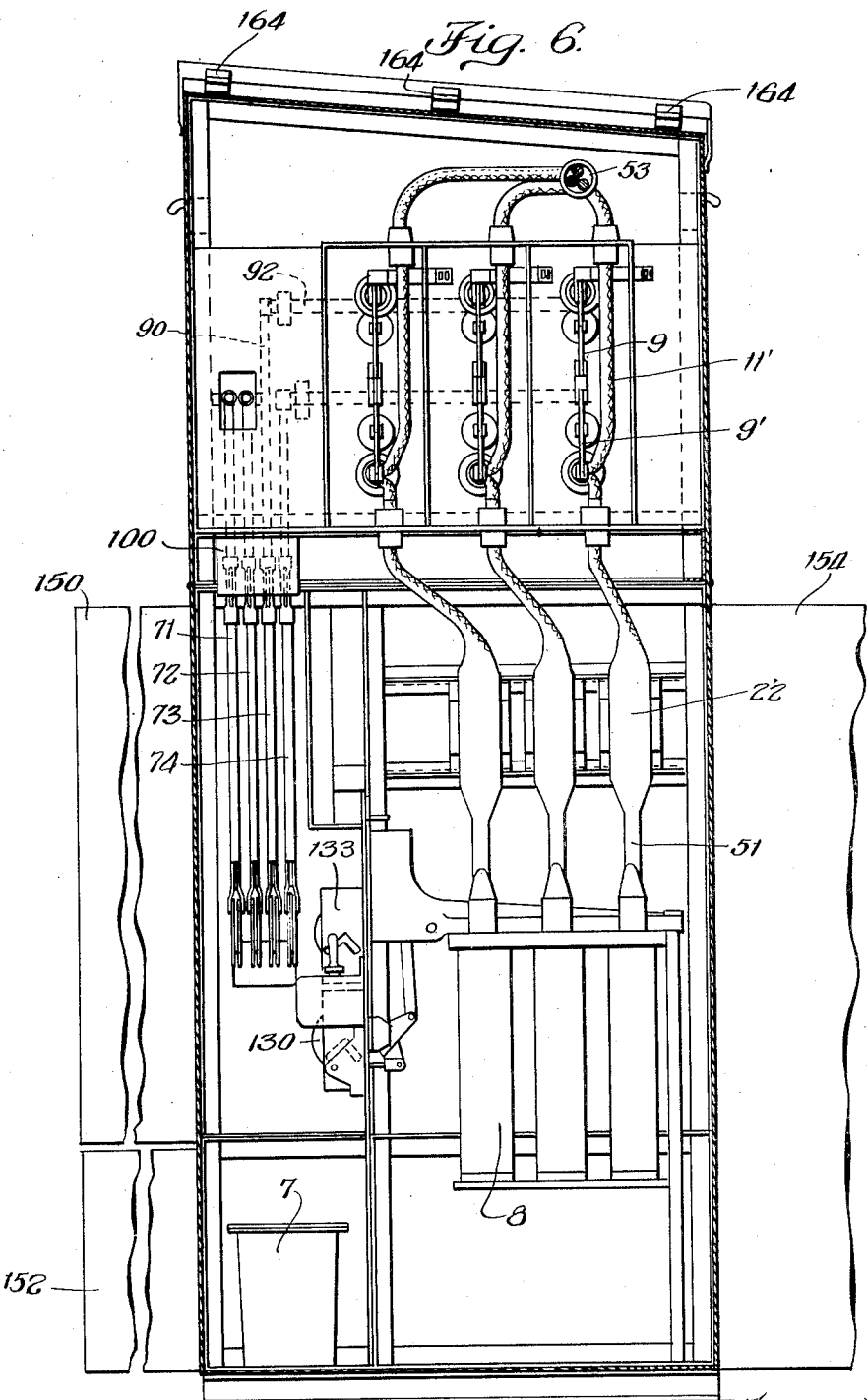

The oil circuit breaker 8 is mounted in the lower section of the switch house and toward the rear thereof and is operated by a standard form of operating mechanism indicated at 130 in Figures 4 and 6, the operating mechanism operating all three poles of the circuit breaker in unison, as is usual. While the circuit breaker shown is of the manually operable kind, it is, of course, understood that, if desired, a remote control operating mechanism for the circuit breaker may be installed.

The two transformers 7 for furnishing the station light and power are mounted in the lower section of the switch house at the front thereof. It is to be noted that one of the transformers is appreciably larger than the other. This arrangement is provided for the reason that the station light circuit is fed from one transformer only, as may be seen in Figure 1, whereas the station power is obtained from the two transformers connected in open delta. The 110 volt tap is, of course, taken off of the larger one of the two transformers 7. The fuses 25 shown in Figure 1 are mounted in the fuse cabinet 45 (Figures 4 and 7). The fuses 27 on the secondary side of the station light and power transformers, as seen in Figure 1, are in reality fuse switches, that is, they are switches wherein the switch blades are made of insulating material upon which the fuse is mounted or, they may be of the type wherein the fuse itself forms a portion of the switch blade. The fuses 27 that are in the power circuit, which has been assumed to be at 220 volts, are mounted in the cabinet 133 (Figure 4) and the fuses in the station light circuit, which is assumed to be at 110 volts, are mounted in a cabinet 134. A handle 136 extends outside of the fuse box 133 and a similar handle 137 extends out of the fuse box 136. The handles 136 and 137 are provided for operating the fuse switches to open or close the circuit.

The cabinet 45 wherein the high voltage fuses on the primary side of the station light and power transformers are mounted is provided with a door 138 which may be opened to insert or remove the fuses. The fuses of the high voltage side of the station light and power transformers should not be removed when there is current flowing through them for if they are removed under these conditions, an extremely severe and destructive arc may be drawn. To prevent the removal of insertion of the fuses in the cabinet 45 when the circuit on the secondary side of the station light and power transformers is closed, there is provided an interlock which prevents opening of the door 138 when the switch handles 136 and 137, on the secondary side of the transformers are in the closed position. The interlock is so arranged that with the switches 136 and 137 open the door 138 to the cabinet 45 may be opened and with this door opened, the switches 136 and 137 may not again be closed. This latter provision is a safety measure for if it were not provided it would be possible to reclose the switch handles 136 and 137 after the door 138 has been opened and before the fuses in the cabinet 45 have been removed or inserted into place, as the case may be. The interlock arrangement is shown more particularly in Fig. 4. The operation of the interlock is substantially the same as that shown in connection with the switch house of Figure 37, to be presently explained, and the manner of operation of this interlock will be apparent as the description proceeds.

As previously pointed out, two conductors indicated at 42 in Figure 7 extend from the bottom portion of two of the line conductors 37 into the fuse cabinet 45. After passing through the fuses within the cabinet two of the conductors and a third which is the neutral extend to the primary side of the transformers 7. The conductors outgoing from the cabinet 45 are shown at 140 in Figure 4. The conductors outgoing from the secondary side of the transformers 7 extend through conduits 141 and 142 (Figure 4) to the fuse cabinets 133 and 134, respectively. The conductors outgoing from the fuse cabinets 133 and 134 are enclosed in conduits 143 and 144, respectively. After furnishing the necessary light and power for use in the switch house shown in Figure 4, the station light and power conductors extend out of the switch house in conduits 145 which extend along the various switch houses.

The panel 15 whereon is mounted the demand watt-hour meter 18, the ammeters 17 and the cut-out relays 16, is mounted at the front of the switch house, as shown in Figure 4. The current transformers 6 for furnishing the metering current are mounted on brackets at one side of the switch house and are separated from the rest of the apparatus in the switch house by an asbestos wood enclosure indicated at 148 in Figure 5.

The upper portion of the lower section of the switch house is provided with two doors 150 and 151 at the front of the switch house for permitting access to the switch house for operating the disconnect switches, oil circuit breaker, or for reading the instruments. The lower portion of the front of the switch house is provided with two doors indicated at 152 and 153 for permitting access to the portion of the switch house wherein the station light and power transformers are located. The lower section of the rear of the switch house is provided with two hinged doors one of which is indicated at 154 in Figure 6. The doors 154, of which there are two in the same manner as there are two doors 150 and 151, are of a length equal to the combined length of the doors 150 and 152. The disconnect switches are interlocked with the rear doors in a manner to be more fully set forth as the description proceeds so as to prevent opening of the rear doors when the conductors in the lower section of the switch house are alive. The rear doors of the certain switch houses are interlocked with other switch houses, what are known as "Cory" interlocks being used, as will be explained hereafter.

The roof of the switch house is divided into three sections indicated at 160, 161 and 162, each of the sections extending from the front to the rear of the switch house. The central section 161 is stationary and the sections 160 and 162 are hinged to the section 161, as indicated by the hinges at 163 and 164, respectively.

The transit barriers between the disconnect switches in the upper section of the switch house are removable and with the transit barriers removed and the hinged covers 160 and 162 opened access can be had to the disconnect switches as required for inspection or repair purposes.

Before proceeding with a description of the interlocking mechanism for interlocking the various switches and switching units, it may be well to describe the feeder switch house 200, and for this purpose reference may be had to Figures 10 to 14, inclusive.

The switch house 200 and the bus connecting cabinet 240 are respectively substantially of the same construction as the switch house 2 and the bus connecting cabinet 25, previously described. Similar reference numerals in this switch house indicate parts similar to those of the corresponding numerals in the switch house previously described, and no further description of these parts need be given. The main busses 10 extend through the bus connecting cabinet 240 as do the transfer busses 11. Conductors 250 are electrically connected to the main busses 10 and extend through the main bus compartment 27 of the connecting cabinet, through the conduit 252, to the switch house; and conductors 251 are connected to the transfer busses and extend through the transfer bus compartment of the connecting cabinet, through the conduit 253, to the feeder switch house 200.

The conductors 250 are shown supported by suitable insulators 254 in the main bus compartment of the connecting cabinet. A fourth conductor 256 in the main bus compartment 27 of the connecting cabinet is connected to the main bus neutral and extends through the conduit 252 into the switch house. The neutral conductor of the main bus is insulated and the conductor 256 extends throughout the switch house. The feeder neutral, the regulator potential transformer neutrals and the regulator neutrals (after passing through the oil switch 208) are connected to the main bus insulated neutral 256. As may be seen in Figures 12 and 14, the main bus conductors 250 extend through the conduit 252 in the upper compartment of the switch house, through the main disconnect switches 202, to the lower section of the switch house where they extend through the oil switch tripping current transformers 203 to the oil switch. From the oil switch the conductors, which are indicated at 205, extend to the potential regulators. The three conductors 205 extending from the oil switch 204 extend through three nipples 260, 261 and 262 to the bus connecting cabinet. The nipples 260, 261 and 262 extend into a compartment 263 in the bus connecting cabinet. The compartment 263 is the regulator leads compartment and the conductors within the nipples extend through conduits 264, 265 and 266 to the three regulators 210, shown more particularly in Figure 2.

Each of the conduits 264, 265 and 266 carries three conductors, one of which is the conductor 205 extending from the oil circuit breaker to the potential regulators; the second is the conductor 206 extending from the regulator to the switch house and thence out to the feeder, and the third is the conductor 207 which is the neutral of the regulators and extends into the switch house from whence it extends through the oil circuit breaker 206 to the insulated neutral of the system. The return conductors 206 extending from the regulator through the nipples 260, 261 and 262 to the switch house extend through the current transformers 220, as may be seen in Figures 13 and 14, to the lower terminal clip of the feeder disconnect switches 215. The upper terminal clip of the disconnect switches 215 is electrically connected with the lower terminal clip of the transfer bus disconnect switches 217 and the feeder conductors 216' are connected to the juncture of those two terminal clips. The three feeder conductors 216' extend through a nipple 268 into the bus connecting cabinet from where they connect up to the outgoing feeder 216. The conduit 270 (Figure 10) extends out of the switch house bus connecting cabinet preferably under ground to the various points where the electric power is utilized.

The feeder conductors 216 within the conduit 270 comprise three conductors, one for each phase and a fourth which is the insulated neutral of the system and is connected to the insulated neutral of the main bus 10, as may be seen in Figure 10. The transfer bus conductors 251 are connected to and disconnected from the feeder conductors 216' by means of the disconnect switches 217.

Figure 14:
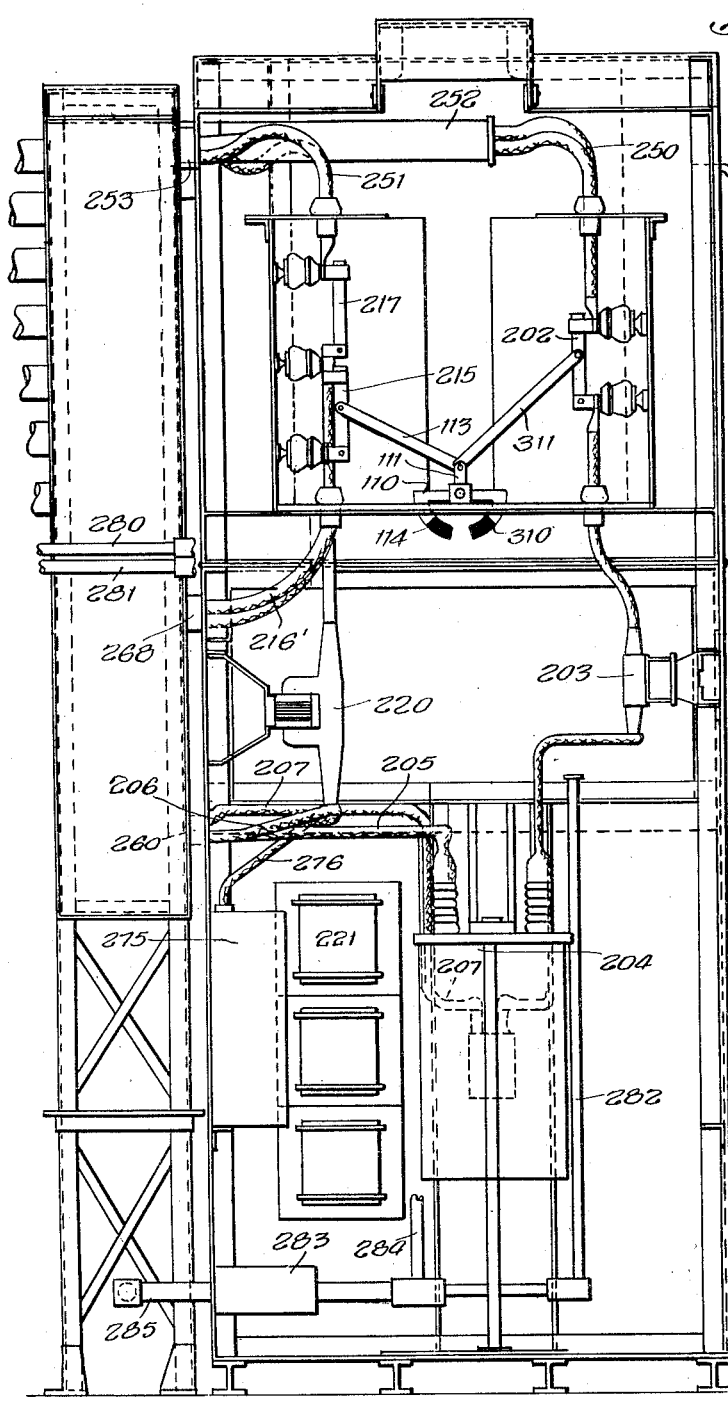
Figure 14 is a rear view of the feeder switch house with the rear wall removed.

A fuse cabinet 275 is mounted within the switch house at the rear thereof, as may be seen in Figures 13 and 14. The fuses 225 (Figure 1) on the primary side of the potential regulator transformers 221 are mounted within the fuse cabinet 275. Three conductors indicated at 276 extend into the fuse cabinet, being connected to the line conductors that extend through the current transformers 220 at the lower portion of those transformers, as indicated more particularly in Figures 13 and 14. The outgoing conductors from the fuse cabinet extend through a conduit 278 to the primary side of the potential transformers 221.

The station light and power conductors extend to the switch house in two conduits, one of which contains the 110 volt conductors and the other the 220 volt conductors. The conduits are indicated at 280 and 281 in Figure 14. Power conductors for actuating the regulators extend through a conduit 282 to a terminal box 283 within the switch house. The conductors from the secondary side of the regulator current transformers 220 extend to the terminal box 283 through a conduit indicated at 284.

The conductors from the secondary side of the potential transformers 221 for controlling the potential regulators extend to the same terminal box 283. The conductors from the regulator current and potential transformers and the power conductors from the conduit 282 all extend from the terminal box through a conduit 285 (Figure 14) and a conduit 286 (Figure 10) to the potential regulators. The feeder grounding switch 218 is mounted at the lower section of the front of the switch house, as may be seen in Figures 11 and 12. The blades of the three poles of the disconnect switch are grounded and conductors 290 from the upper terminals of the respective switches extend through conduits 291 and 292 to the conduit 293 (Figure 10) which extends to the bus connecting cabinet. The three conductors within the conduit 293 are connected each to one of the terminal clips of the outgoing feeder phase conductors 216. These connections are indicated in dotted lines in Figure 10 in order to avoid confusion between these conductors and the conductors 216'.

The gang operated switches 202, 215 and 217 are operated by the respective switch operating levers 295, 296 and 297. The manner of operation of these switches is identical to that of the disconnect switches mounted in the totalizing metering switch house previously described, as is apparent from the drawings.

The blades of the grounding switch 218 are mounted upon a common shaft 298 which is rotated by the lever 299 through the handle 300 to actuate the switches. The disconnect switches are interlocked with the oil circuit breaker 204 by the interlocks 303 to prevent the manipulation of the disconnect switches when the circuit breaker is closed and to prevent the simultaneous closure of certain of the disconnect switches and of the grounding switches 218, as will be more fully pointed out as the description proceeds.

The disconnect switches mounted in the upper section of the switch house are separated by transit barriers as are the switches in the switch house previously described. Signal flags are provided for indicating the open or closed positions of the respective blades of the disconnect switches 202 and 215, as may be seen in Figure 14. A plan view of the disconnect switches 202, 215 and 217 together with the means for operating the signalling flags would be identical to that shown in Figure 9 for the totalizing metering switch house. The signalling flags controlled by the respective switch blades 215 are identical to those controlled by the blades 4 in Figure 5, and the parts have been given the same reference characters.

The signal flags controlled by the switch blades 202 are identical to those controlled by the switch blades 215 being staggered with respect to the flags 114. It is to be noted that while the flag 115 of Figure 5 has no vertical arm corresponding to the arm 111 in connection with the flag 114, the flags 310 have vertical arms corresponding to the arms 111 associated with the flags 114 and the lever 311 is pivoted to the vertical arms integral with the flag portion 310.

A description will now be given of the interlock mechanism shown at 303 in Figure 11 and for this purpose reference may be had more particularly to Figures 15 to 18, inclusive. The mechanism between the interlocking mechanism 303 and the disconnect switch operating levers is the same as that previously described in connection with Figure 4, and, as shown in Figure 16, comprises a link 78 pivoted at 320 to the angle bracket 321 which is secured to the frame of the switch house. The disconnect switch operating levers of which one only has been shown at 297 in Figure 16 are pivoted at their upper ends to the corresponding links 78. The other two levers 295 and 296 of Figure 12 each extend to links similar to the link 78 of Figure 16. The switch operating lever 297' for operating the corresponding disconnect switch is pivoted to the link 78 at the point 81. Downward motion of the lever 297 causes a downward motion of the link 78 with a corresponding downward motion of the lever 297'.

The bell crank 97 pivoted at 98 is connected to the link 78 by means of a link 96 and is connected to the interlocking mechanism by means of a link 99'. The links 99, 99' and 99" are pivoted, respectively, to the three levers 325, 326 and 327, as may be seen in Figure 15. The lever 325 is connected to the lever 297' that controls the transfer disconnect switch 217 (Figure 1); the lever 326 is connected to the operating lever 296' that controls the regulator disconnect switch 215, and the lever 327 is connected to the lever 295' that controls the main disconnect switch 202. Figures 15 and 16 show the mechanism when the disconnect switches are all closed. The shaft 330 is connected to the operating mechanism of the oil circuit breaker 204 in any convenient manner. In the present structure a rod extends vertically upward from the oil circuit breaker operating mechanism to the shaft 330 and is connected thereto by means of a link (not shown) so that upon upward or downward movement of the vertical rod upon the actuation or release of the oil circuit breaker the member 330 is rotated through a slight angle. The drawings show the position assumed by the shaft when the oil switch is open. Three cranks, 331, 332 and 333 are secured to the shaft 330, as may be seen in Figure 15.

As may be seen in Figure 16, the crank 332 carries a locking block 335. When the oil circuit breaker is open the member 326 may be moved from the open position shown in Figure 16 to the closed position which it assumes when the operating rod is moved downward to close the disconnect switch. It is to be noted that the member 326 has two notches therein indicated at 336 and 337. When the regulator disconnect switch, which is the switch controlled by the member 326, is in the closed position, the notch 337 is under the locking lug 335, as may be seen in Figure 16. When the regulator disconnect switch is in the open position, the notch 336 is beneath the locking lug 335. It is thus apparent that the lug 335 can be actuated when the disconnect switch is in either the closed or the open position whereas the disconnect switch can be actuated only when the lug 335 is in the withdrawn position, that is, when the oil circuit breaker is open. The operating shaft 330 has three cranks 331, 332 and 333 thereon for controlling the movement of the three sets of disconnect switches 202, 215 and 217. The crank 331 controls the member 327 which is connected to the lever 295' that operates the main bus disconnect switch, in the same manner that the crank 332 controls the lever 326 and, as is apparent from Figure 18, the member 327 cannot be moved from the open or closed position when the locking lug carried by the crank 331 is within either of the two notches provided in the member 327.

The member 327 cannot, however, interfere with the operation of the oil switch since with the member 327 in either the closed or the open position, there is a notch immediately beneath the locking lug carried by the crank 331. The member 325 (Figure 17) which controls the locking and releasing of the transfer disconnect switch 315 of Figure 1 is controlled by the crank 333 upon the shaft 330 and when the oil circuit breaker is in the open position, the locking member 340 is in a notch in the member 325 so that the member 325 cannot be moved and the transfer disconnect switch cannot be actuated. When the oil circuit breaker is closed the transfer bus disconnect switch controlled by the lever 325 may be actuated to either the closed or the open position insofar as the interlock on the oil switch is concerned and with the transfer switch controlled by the lever 325 in either the closed or the open position the oil switch may be actuated. It is thus apparent that the arrangement shown permits an actuation or release of the oil switch regardless of the open or closed position of any of the disconnects, but the disconnects may be operated only under the control of the oil switch.

The member 325 for controlling the actuation of the transfer switch is in addition controlled by a locking lug 341 (Figure 17) and another lug 342. The locking lug 341 is controlled by a shaft 343 and the locking lug 342 is controlled by a shaft 344.

The shaft 343 is controlled by the member 327 through a link 345 and a crank 346, as is apparent from Figure 18, and the shaft 344 is controlled by the member 327 through a link 348 and a crank 349, as is apparent from Figure 16. The locking lugs 341 and 342 assume the position shown in Figure 17 when the main switch 202 of Figure 1 and the regulator disconnect switch 215 of Figure 1 are both in the closed position. When either of these switches is in the open position the corresponding locking lugs 341 and 342 descend into notches in the member 325 and prevent actuation of the transfer switch 217.

The main bus disconnect switch operating lever 295' of Figure 15 in addition to being controlled by the interlock mechanism 303 is controlled by a Cory interlock, to be presently described. As may be seen in Figure 18 a part 350 of the member 327 extends through a slot in the interlock box. A Cory lock 351 has a crank lever 352 extending therefrom and a rod 353 is pivoted to both the end 350 and to the crank 352. The Cory lock 351 with its lever 352 extending therefrom is of a standard construction and a description thereof need not be given at this time. It may be sufficient to state that the crank 352 is pivoted to swing from the position shown in full lines in Figure 18 to the position shown in dotted lines, and that the interlock 351 is provided with a key which may be inserted at 355 for controlling this movement.

The key shown in Figure 18 at 356 cannot be removed from the key hole until the lever 352 has been moved to the dotted line position and when the lever has been moved to the dotted line position, the key may be removed. With the key removed from the key hole the lever 352 cannot again be moved to the position shown in full lines. It is thus apparent that with the disconnect switch controlled by the lever 327 in the closed position the key is in the key hole and cannot be removed. When the switch has been moved to the open position, the key may be removed and when it is removed, the switch cannot be operated to the closed position. This is of particular importance in connection with the Cory interlock system between the switch houses of the switching center, as will be more fully set out in the following description.

Reference may now be had to Figures 19 and 20 showing the interlocks between certain of the switches in the totalizing metering switch house. As may be seen from an inspection of Figures 20 and 16, the connections between the interlocking box 100 and the switch operating levers is the same in both cases and a further description of the mechanical connections between the switch operating lever 71 and the interlocking box 100 of Figure 20 need not be again given.

The oil circuit breaker mechanism 8 of Figure 1 is mechanically connected by means of a link or the like to the shaft 360 so that upon operation of the oil circuit breaker to the closed or open position the shaft 360 is rotated through a very small angle. The shaft 360 reciprocates the locking lug 361 through a crank arm 362 to control the transfer bus disconnect switch 4 of Figure 1. As is apparent from Figures 19 and 20, the shaft 360 may be rotated at any time regardless of whether the link 363 which is connected to the disconnect switch operating mechanism is in the switch open or the switch closed position, whereas the disconnect switch can not be operated from either the closed or the open position when the oil circuit breaker is in the closed position, since when the oil circuit breaker is in the closed position the locking lug 361 rests in one of the notches 365 or 366 in the member 363. The oil circuit breaker operated shaft 360 is interlocked only with the switch operating lever 72 which is the lever that controls the disconnect switches 4 of Figure 1. The switch operating levers 73 and 74 that control the grounding switches 9 and 9' of Figure 1 are not connected to the interlock box 100. Instead those switches may be padlocked in their open or closed positions, as desired. The operating shaft 71 that controls the main bus disconnect switch 3 is arranged to be locked in position by means of a member 367 which is similar to the member 363 except that it is not provided with notches such as 365 and 366.

The member 367 extends through the interlock box but is not interlocked with the oil circuit breaker operating shaft 360. The members 363 and 367 extend through the interlock box 100 to the Cory interlocks 370 and 371, respectively. The connections between the Cory interlocks 370 and 371 and the respective members 363 and 367 are the same as shown in Figure 18. The interlock 370 for the transfer bus switch is of the same construction as is the interlock 351 of Figure 18. The interlock 370 is provided with a removable key and, when the switch is in the open position, the lock 370 prevents the movement of the lever 371' until the key has been inserted into place and turned. When this has been done, the disconnect switches 4 of Figure 1 may be operated thereby operating the link 371 through the member 363. When the disconnect switch has been operated to the closed position the key that has been inserted into the Cory interlock mechanism 370 cannot be removed, it being necessary to operate the switch to the open position before removal of the key can be effected. This is a standard Cory lock and a further description thereof need not be given at this time.

The Cory interlock 371 is somewhat of a different construction from the lock 370 and is also of a standard well known form. The interlock 371 differs from the interlock 370 in that it is provided with an additional key hole 375 for receiving a transfer key. Two keys are provided, one for the key hole 355 and the other for the key hole 375 and both keys must be inserted into their respective locks before the crank 352 can be released and moved from the switch closed position, shown in full lines in Figure 20, to the switch open position. When the switch 3 controlled by the crank of the interlock 371 has been moved to the closed position, one of the keys is released and the other is held locked in the interlock box and cannot be removed until the switch has been operated to the open position.

Reference may now be had to Figure 21 showing the relationship of the Cory interlocks between the various switch houses. The dotted lines show the path of travel of the interlocking keys. In connection with this figure reference may also be had to Figure 22 showing in a single line form the circuit of Figure 1 and the various switches that are controlled by the respective Cory interlocks. It is assumed that the switching center under discussion has four outgoing feeders. Each of the outgoing feeders extends from a separate switch house 200, as previously described, and there is provided one totalizing metering switch house which is the switch house 2 previously described.

Assume that all of the feeder disconnect switches 202 as well as the switches 3 and 4 are closed and it is desired to open the switch 380 on the high tension side of the transformer bank 381. Before this can be done it is necessary to open the disconnect switches 3 and 4 (Figure 22) thus opening the circuit through the line 1. If the outgoing feeders 216 are being fed from the main bus then it is necessary to disconnect them from that bus before the switch 3 can be opened, for if the switch 3 were opened while one of the feeders is connected to the main bus, a destructive arc would be drawn because the switch 3 is not designed to open under load. The Cory interlocks shown in Figure 21 prevent this from happening. The procedure that must be followed before the switch 380 of Figure 22 can be opened is as follows: The main bus switches 202 for each of the four outgoing feeders must be opened. The keys 356 in the key holes 355 of each of the interlocks 351 may now be removed from the key holes 351 and inserted each into one of the four key holes 385 in the Cory key transfer 384. It is to be remembered that once the keys 356 are removed from the interlock 351 the switches 202 cannot be reoperated to the closed position. When the four keys 356 have been inserted into the key holes 385 the key 386 in the key transfer lock 384 may be removed.

When the key 386 is removed from the key transfer 384 the four keys in the slots 385 are held locked in the key transfer and cannot be removed until the key that has been removed from the key hole 386 is again reinserted in place, and the key in the key hole 386 cannot be removed unless all four keys 356 are in the key holes 385. The key from the key hole 386 is then inserted into the key hole 375. The key 351' is at this time in the key hole in the Cory lock 371 and with both keys in place it is possible to open the disconnect switch 3. Once the disconnect switch 3 is open the key 351' is released thereby permitting its removal whereas the key 375 is locked in place and cannot be removed until the switch 3 has been closed. If the key 351' is removed, the switch 3 cannot be closed. When the transfer disconnect switch 4 is opened, the key 355' in the interlock 370 may be removed, and when the key is removed, the switch 4 cannot be again reclosed. With the switches 3 and 4 open the keys 351' and 355' are removed and inserted into the corresponding key holes in the key transfer 390. When this has been done a key 391 held in the key transfer 390 may be removed. This was not possible prior to the insertion of the keys 351' and 355' into the corresponding key holes in the key transfer 390 and, when the key 391 has been removed, the keys 375 and 355' are held locked in the key transfer 390.

It is thus apparent that the key 391 cannot be removed from the key transfer 390 until all of the feeder main bus disconnect switches 202 have been opened and until the switches 3 and 4 have also been opened. Under these conditions the line from the transformer bank 381 is carrying no current and, therefore, the switch 380 may be opened safely. To open the switch 380 the key 391 is turned in the key hole 392 in a Cory lock 393 of a construction similar to the lock 351 and when this is done the switch 380 may be opened. When the switch 380 is opened the key 391 cannot be removed from the key hole 392. The Cory lock 393 is connected to the operating mechanism for the three switches 380 in any desired manner, so that the switches 380 cannot be operated when the Cory lock mechanism is locked. The switches 380 are mounted preferably on top of a tower where the incoming high tension lines 395 terminate. To reestablish service the switches 380 are closed and then the key 391 is removed from the lock 393 and inserted into the key transfer 390 thereby permitting the removal of the keys 355' and 351' from the transfer 390. The keys 355' and 351' are inserted into the locks 370 and 371, respectively, thereby permitting the operation of the switches 4 and 3 and permitting the removal of the key 375 from the lock 371. The key 375 is then inserted into the key hole 386 in the key transfer 384 thereby permitting the removal of the four keys 356 from the key holes 385. The keys 356 may then be inserted into the Cory locks 351 thereby permitting the closure of the disconnect switches 202.

As previously pointed out, doors are provided at the rear of the switch house to permit access thereto for inspection or repair purposes. It is desirable to prevent the opening of the rear doors when various parts within the lower section of the switch house are electrically alive, and to accomplish this end an interlock is provided between the disconnect switches at the top of the switch house and the rear doors.

Reference may now be had to Figures 23 to 26, inclusive, showing the interlock between certain of the disconnect switches and the rear doors of the switch house wherein those switches are located. Two levers indicated at 400 and 401 extend from the operating shaft of the switches that are to be interlocked with the rear doors to the interlock mechanism shown more particularly in Figure 24. The upper end of the lever 400 is connected to the shaft that operates the main bus disconnect switches 202 of Figure 1, said lever being connected to said shaft by means of a bell crank so that upon rotation of the operating shaft the lever 400 is reciprocated. The upper end of the lever 400 is shown in Figure 12. The upper end of the lever 401 is connected to the operating shaft that controls the regulator disconnect switches 215, being connected thereto by means of a crank so that upon rotation of the shaft the lever 401 is reciprocated.

Figure 24 shows the position of the levers when the corresponding switches are in the closed position. The rod 401 is pivoted to a bell crank 402 which swings about the pivot 403. The lever 405 is pivoted to the opposite end of the bell crank at 404 so that upon movement of the rod 401 the lever 405 is moved in a horizontal direction. The lever 405 has two notches therein, as indicated at 406 and 407, and the lever is guided through the guiding members 408 and 409. A similar lever 410 having notches 411 and 412 is similarly operated by the rod 400. The rear doors 154 and 154' are hinged at 415 and 415', respectively, to open outwardly, as indicated by the arrows at 416 in Figure 23. A rod 420 has one end 421 bent downward and extending through a hole in a bracket member 422 which is secured to the inner side of the door 154. The rod 420 is held against removal from the bracket 422 by means of a cotter pin. The opposite end of the rod 420 is supported by a member 425 there being a hole in the member 425, as indicated at 426 in Figure 25, through which the rod 420 may move. A plate 428 pivoted at 429 obstructs the movement of the rod 420 through the hole 426 under certain conditions which will be explained presently. The member 428 is pivotally supported at 429 by means of a bracket which is secured to the angle member 430. A similar angle member 431 is secured on the inner side of the switch house adjacent the door to provide a snug closure for the top portion of the door.

The member 428 has a downward projecting tongue 435 which rides in a slot in a cooperating locking member 438 mounted on the inside of the door 154. When the members 405 and 410 are in the position shown in the drawings, the member 428 cannot swing in a clockwise direction about the pivot 429 due to the fact that the top portion of the member 428 abuts the members 405 and 410. Under these conditions the rear door 154 cannot be opened since the downwardly projecting tongue 435 is in the slot in the member 438. When the switch 215 of Figure 1 is moved to the open position, the lever 401 is moved downwardly thereby moving the member 405 to the left, as seen in Figure 24, by an amount just sufficient to bring the notches 407 and 406 above the member 428 carried by the door 154 and above the similar member carried by the door 154', as will be presently set forth. When the main bus disconnect switches 202 of Figure 1 are moved to the open position the lever 400 is moved downward resulting in a movement of the lever 410 to the right by an amount just necessary to bring the notch 411 in the member 410 directly above the member 428. When both the notches 407 and 411 are directly above the member 428 this member is free to swing in a clockwise direction about the pivot 429. The door 154 may now be opened, and when this is done as the door swings outwardly the member 438 acting upon the tongue 435 of the member 428 causes this member to swing about the pivot 429, the upper edge of the member 428 entering the notches 407 and 411.

Upon continued outward movement of the door 154 the bottom of the tongue 435 lies upon the shelf 439 which is a part of the member 438. It is to be noted that when the door 154 is closed the member 428 is directly in back of the opening 426 in the guiding lug 425 for the rod 420 and the end of the rod cannot project through the opening 426 beyond the member 428. When the door 154 has been opened by an amount necessary to bring the bottom of the tongue 435 on to the shelf 439 the member 428 has swung about its pivot sufficiently to clear the hole 426 and upon continued movement of the door the rod 420 rides through the hole 426. When the door has been opened by an amount sufficient to cause the shelf 439 to clear the bottom of the tongue 435, the rod 420 is extended through the hole 426 by an amount sufficient to prevent the lug 428 dropping downward, in a counter clockwise direction about the pivot 429. Further opening movement of the door produces no effect upon the member 428, said member being held with its top portion in the notches 407 and 411 by the rod 420 which extends through the hole 426. As long as the rear doors are open it is not possible for the switches that are connected to control the members 400 and 401 to be moved to the closed position because the members 405 and 410 are held against longitudinal movement by the upper portion of the member 428 which rests in the notches 407 and 411.

Upon moving the door 154 to the closed position the shelf 439 comes under the bottom of the tongue 435 before the rod 420 has been withdrawn from beneath the member 428 and upon continued closing movement of the door, the rod is first withdrawn from beneath the member 428 and thereafter the surface 440 of the member 438 strikes the corresponding surface of the tongue of the member 428 and forces the locking member 428 to swing in a counter clockwise direction about the pivot 429 until the bottom of the tongue rests fully in the notch in the member 438. At this time the door is fully closed and the member 428 is clear of the notches 407 and 411 in the members 405 and 410 and the switch controlled rods 400 and 401 are free to be moved. A locking arrangement indicated at 445 is provided for the door 154′ said locking arrangement being identical to that provided for the door 154. It is to be noted that neither door can be opened until both switch controlled rods 400 and 401 are moved to the switch open position and that neither of the rods 400 and 401 can be moved to the switch closed position until both doors have been reclosed. It is thus apparent that I have provided a simple interlock between the disconnect switches in the upper portion of the switch house and the rear doors of the switch house so as to render the switch house absolutely safe against an inadvertent opening of the rear doors while the parts within the switch house adjacent the rear doors are alive.

The rear doors of the totalizing metering switch house 2 is likewise provided with interlocks of the kind shown in Figures 23 to 26. In the case of the totalizing metering switch house 2 the lever 401 is connected to the shaft that operates the transfer bus disconnect switches 4 through a crank lever as in the case of the feeder switch house, and the notches 406 and 407 are arranged as shown in Figure 24 so that the transfer bus feed disconnect switches 4 must be opened before the notches 406 and 407 are moved above the members 428. In the case of the totalizing metering switch house the lever 400 is connected to the shaft that operates the transfer grounding switch 9′ and the notches 411 and 412 in the lever 410 are located to the right of the position shown in Figure 24 so that when the grounding switch 9′ is in the closed position the notches 411 and 412 are in a position to permit opening of the doors 154 and 154′ whereas when the lever 400 is moved downward upon the opening of the grounding switches 9′ and the member 410 is moved to the right, the notches 411 and 412 are advanced beyond the positions of the members 428 and 429 so that the rear doors cannot be opened.

An interlock is provided between the grounding switch 218 in the feeder switch house (Figures 11 and 12) and the lower front door thereof so that the door can not be opened unless the grounding switch is closed, thus grounding the apparatus at the front of the switch house, and the grounding switch can not be opened unless the door is closed. This interlock is shown more particularly in Figure 11a. As previously stated, the blades 218 of the three phases are mounted on a common shaft 298 which is rotated by a lever 299, a crank 460 connecting the lever to the shaft. A hook 461 is mounted to be turned upon turning the shaft 460. When the shaft 460 is in the switch open position the end of the hook 461 is inside of an eye in an angle member 462 which is rigidly secured to the door 463. The door in its opening movement is arranged to move in the direction indicated by the arrow 464. It is thus apparent that with the hook 461 in engagement with the eye in the member 462 the door is held against opening movement. To open the door, the switch operating lever 299 must first be actuated to close the switch thereby withdrawing the hook 461 from the eye in the member 462 and thus releasing the door. To prevent the opening of the grounding switch when the door 463 is open another interlock is provided. This interlock comprises a rod 467 bent in the manner shown and hinged to swing about a pin 468 mounted in two angle brackets 469 secured to the door close to the hinged end of the door. A link 470 is secured to the shaft 298 so that upon turning of the shaft the link is turned.

The link 470 carries a pin 471 at the end thereof, said pin riding on the member 467. When the switch is moved to the closed position the link 470 is turned to move the pin along the edge 472 of the bar 467 to the upper level 473 of the bar. With the switch in the closed position, the pin 471 rides on the surface 473 of the bar 467 as the door is swung to the open position, and when the door is fully opened the end 474 of the bar has not cleared the pin 471 and it prevents the movement of the pin in a downward direction and thereby prevents the opening of the switch. It is to be noted that with the door closed and the switch 218 in the open position the pin 471 is in front of the portion 472 and thereby prevents opening of the door. This action is in addition to the action of the hook 461. As previously stated, the bar 467 is hinged to the door close to the hinged end of the door. If the bar 467 and the pin 471 were relied upon to prevent opening of the door there would be a likelihood of something breaking when an attempt is made to force the door open. This is due to the fact that a great mechanical leverage is obtained when one grips the door handle to open the same since the members 469 are close to the hinged end of the door. The hook 461 which is relied upon to keep the door locked shut is hooked to the door at a point remote from the hinged end of the door.

The operating lever 299 is locked with the levers 295, 296 and 297 (Figure 11) so that it can not be operated to close the grounding switch unless the levers 295, 296 and 297 are moved to the switch open position. This interlock consists merely of a rod mounted in back of the handles that operate the levers 295, 296 and 297, said rod being connected with the handle that controls the lever 299. If an attempt is made to move the last mentioned handle while the handles of any of the other levers are in the closed position, that rod abuts against those handles and prevents such movement.

Figure 27:
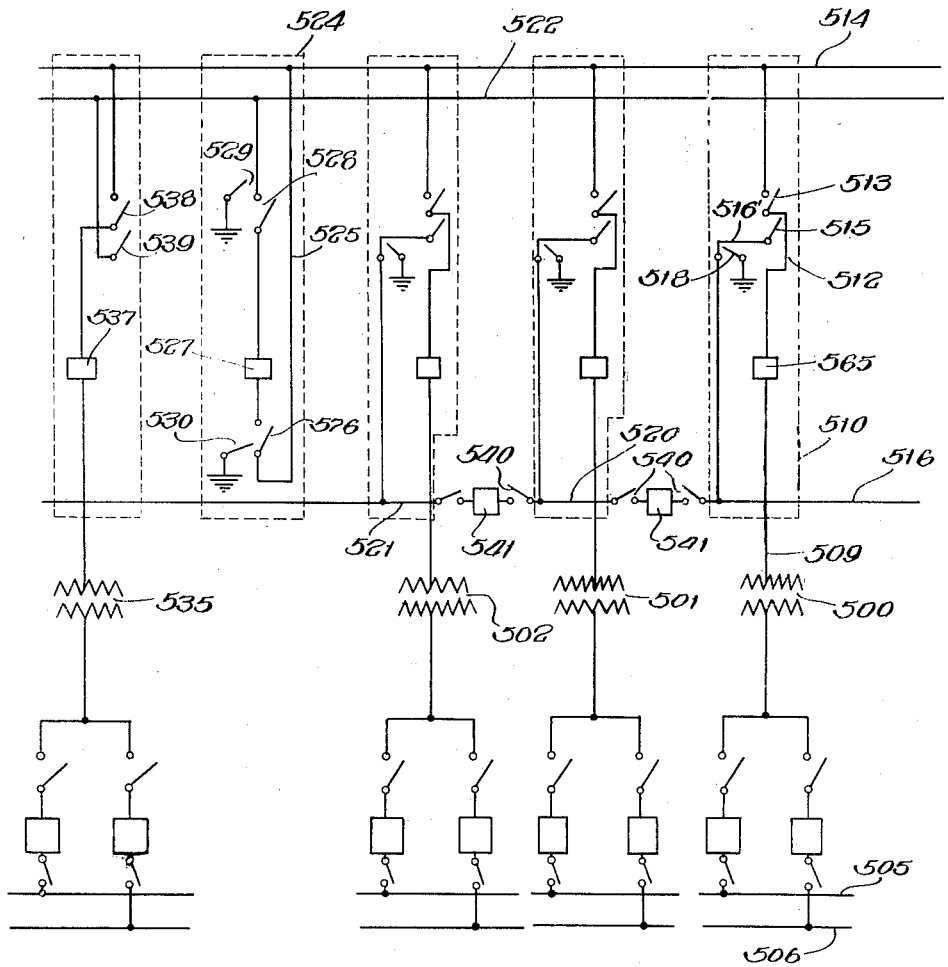
Figure 27 is a simple single line diagram of a large distribution for feeding power to feeder switch houses, such as shown in Figures 10 to 14, inclusive.
Figure 28:
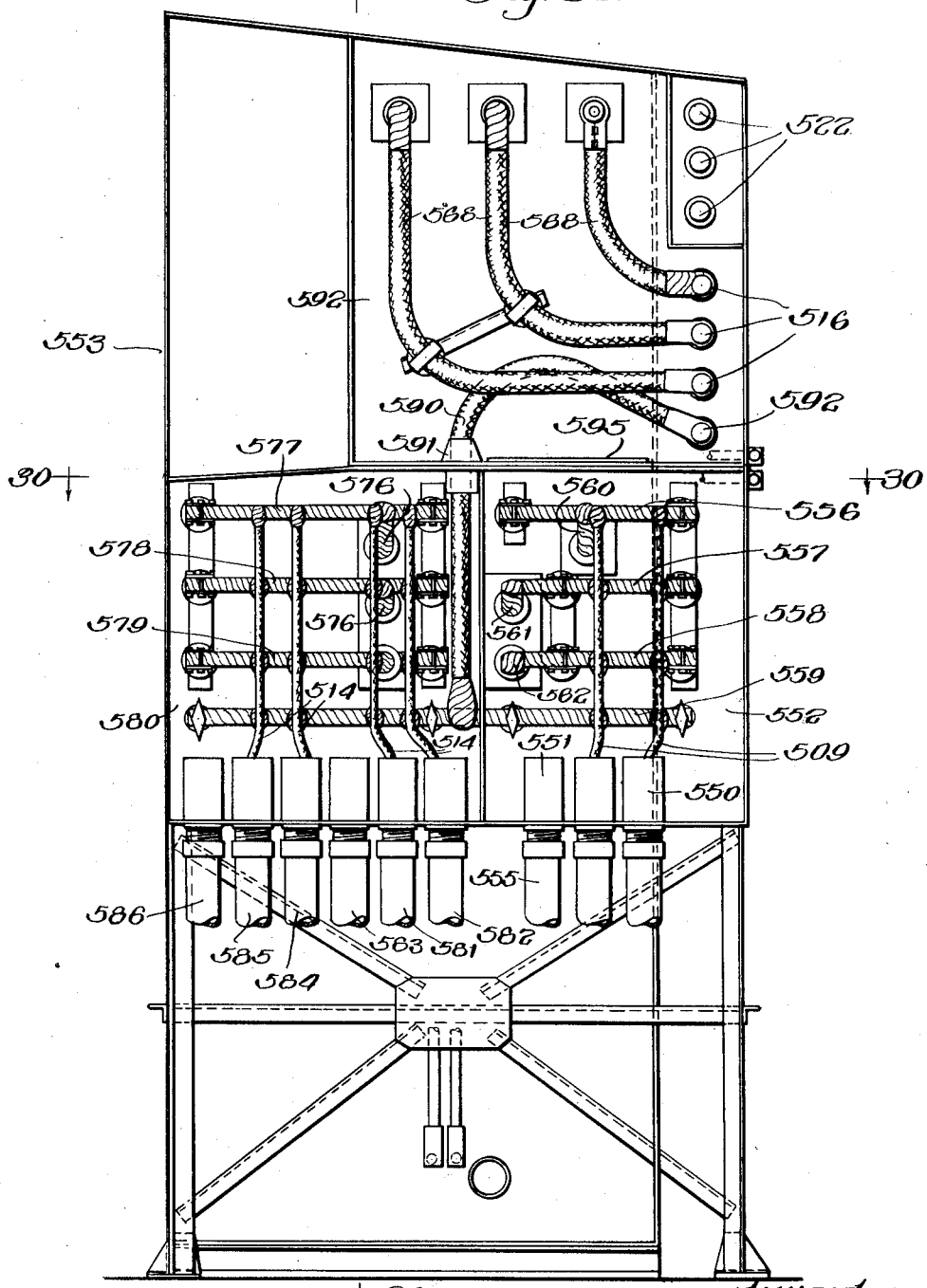
Figure 28 is a section taken along the line 28—28 of Figure 29 showing the bus connecting cabinet for the transformer switch house.
Figure 29:
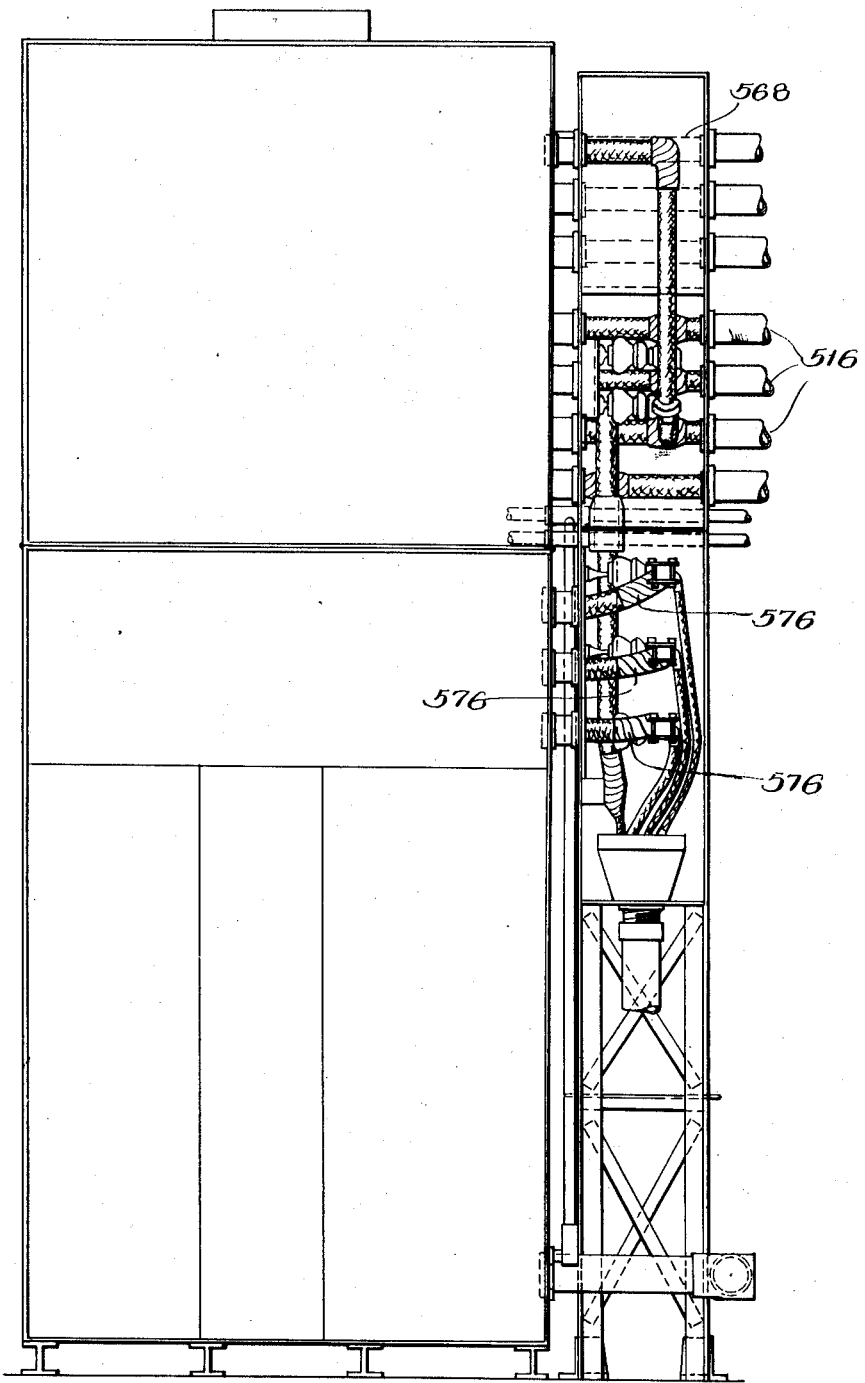
Figure 29 is a section taken along the line 29—29 of Figure 28.
Figure 35:
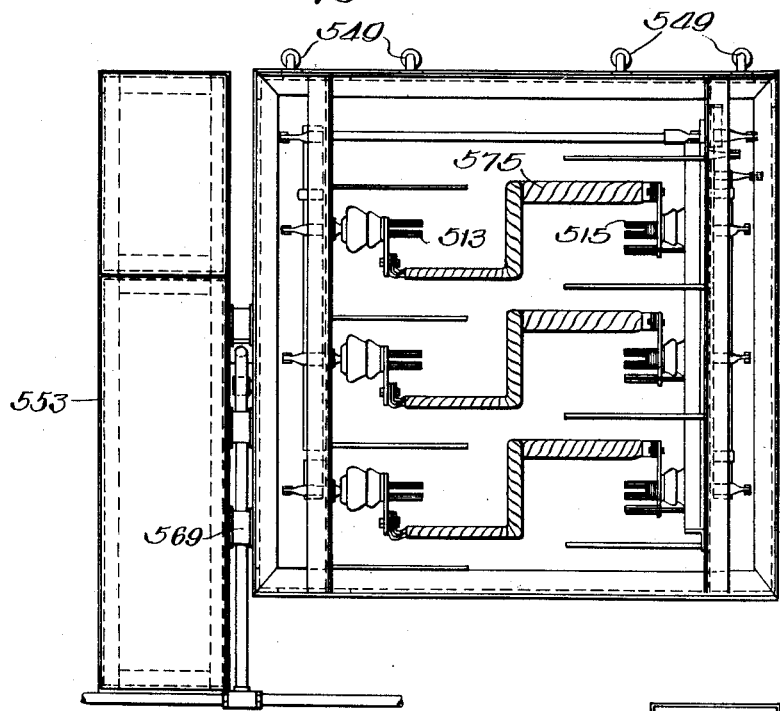
Figure 35 is a sectional view taken along the line 35—35 of Figure 32.
Figure 30:
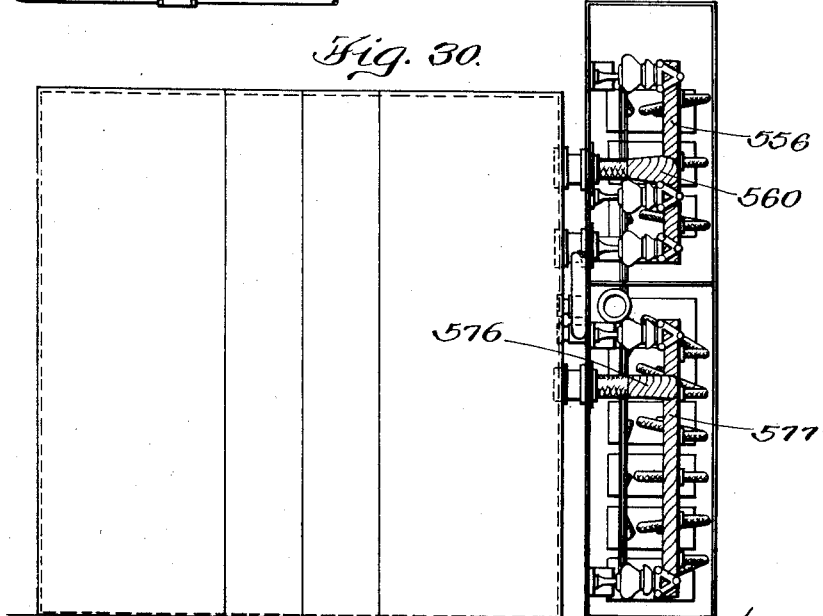
Figure 30 is a section taken along the line 30—30 of Figure 28.

Reference may now be had to Figure 27 showing a circuit diagram in single line form of a distribution center of a larger capacity than that previously described which distribution center carries forward the ideas developed and utilized in the distribution center previously described. Three groups of transformer banks 500, 501 and 502 each consisting of three transformers is provided for transforming the power from incoming high voltage transmission lines to suitable distribution values which may be in the neighborhood of 4,000 volts. The high tension sides of the transformer banks are connected through the usual switching and safety connections to the main and reserve busses 505 and 506, respectively. The three conductors from the secondary side of the transformer bank 500 are indicated at 509 and extend into a transformer switch house 510. The circuit extends through an oil circuit breaker 565 through the conductor 512 to the lower terminal of a transformer bus disconnect switch 513 from the upper terminal of which a connection is extended to the transformer bus indicated at 514. A connection from the lower terminal of the transformer bus disconnect switch 513 may be made to the main bus 516 through a main bus disconnect switch 515, the circuit extending through a conductor 516'. A grounding switch is indicated at 518 for grounding the main bus 516.

The secondary side of the transformer bank 501 feeds a main bus 520 and the secondary side of the transformer bank 502 feeds a main bus 521 all over similar circuits extending through switch houses similar to the transformer switch house 510. The transformer bus 514 and the transfer bus 512 extend through a transfer switch house 524 where a connection is extended from the transformer bus through the conductor 525 and disconnect switch 526 thence by way of an oil circuit breaker 527 and disconnect switch 528 to the transfer bus 522. Grounding switches 529 and 530 are provided for grounding the transfer bus and the transformer bus respectively. A spare transformer bank comprising three transformers is provided. The high tension side of the spare bank is connected over circuits similar to the high tension sides of the transformer banks 500, 501 and 502 while the secondary side extends through an oil circuit breaker 537 and through transformer disconnect switches 538 to the transformer bus and by way of transfer bus disconnect switches 539 to the transfer bus 522. The main bus 516 extends through a number of feeder switch houses, such as 200 of Figure 1, while the main busses 520 and 521 likewise extend through a number of feeder switch houses, such as 200. The transfer bus 522 extends through all of the feeder switch houses 200 that are being fed from either the main bus 516 or 520 or 521. The busses 516, 520 and 521 may be interconnected by means of disconnect switches 540 and oil circuit breakers 541, as shown.

Reference may now be had to Figures 28 to 35, inclusive, showing the transformer switch house 510 and the connecting cabinet therefor. The construction of this switch house is substantially the same as of the switch houses previously described, the difference between the switch houses being in the arrangement of the parts on the inside of the houses. The switch house comprises an upper and a lower section made in separate parts to facilitate shipment, the sections being secured together by welding or bolting, or in any other preferred manner. Although the two sections are separated by a partition of suitable fire resisting and electrical insulating material, ventilation is permitted by a rather free exchange of air between the sections through the many openings provided in the partition for the various connections and operating parts that extend between the sections. A number of ventilators, indicated at 549 in Figures 32, 33, 34 and 35, are provided for ventilating the switch house.

The conductors 509 from the secondary side of the transformer bank 500 extend in two conduits 550 and 551 to the transformer lead compartment 552 of the bus connecting cabinet 553. The conduits 550 and 551 each contain four conductors, one for each phase, the fourth being the insulated neutral of the system.

The corresponding conductors in the two conduits are connected in parallel, two conduits being used only because if all four conductors within one of the conduits were made of a size sufficient to carry the necessary current, the conduit would become objectionably large. A fourth conduit 555 extends into the transformer lead compartment so that similar conductors may be led into that compartment in the future should the output required from the switch house exceed the economical current carrying capacity of the conductors 509.

Three insulated busses 556, 557 and 558, one for each phase of the system, extend through the transformer compartment 552. A fourth bus 559 which is the neutral bus of the system likewise extends through that compartment. The conductors 509 from the conduits 550 and 551 are connected to the respective busses 556 to 559.

A conductor 560 is connected at one end to the bus 556 and extends through an opening in the bus connecting cabinet 553 to the transformer switch house. In a like manner a conductor 561 is connected to the bus 557 and a conductor 562 is connected to the bus 558. The conductors 560, 561 and 562 within the switch house may be seen in Figures 32 and 33. Those conductors extend through current transformers 564 each to one pole of a three pole oil circuit breaker 565. The opposite poles of the oil circuit breaker 565 are connected through current transformers 566 to the lower terminal clip of the disconnect switches 515. The upper terminal clip of the switches 515 are connected through conductors 568 which extend through nipples 569 (Figures 32 and 35) to the transformer switch house bus connecting cabinet 553. Within the bus connecting cabinet the conductors 568 extend to the main bus 516. The main bus 516 extends through the bus connecting cabinet 553 in single conductor nonmagnetic conduits, preferably of aluminum, which conduits extend to the various feeder switch houses, such as 200 of Figure 1, in the manner previously described.

Conductors 575 connect the lower terminal clip of each of the main bus switches 515 with the upper terminal of the transformer bus switches 513. Conductors 576 from the lower terminal clip of each of the transformer bus disconnect switches 513 extend through nipples between the switch house and the bus connecting cabinet into the bus connecting cabinet. Within the bus connecting cabinet the conductors 576 are connected to the respective phase bus bars 577, 578 and 579. The incoming transformer busses 514 extend into the transformer bus compartment 580 of the cabinet 553 in four conductor conduits 581 and 582. Each conduit 581 and 582 contains four conductors, one for each of the three phases and a fourth, which is the neutral of the system. All three phase conductors are included in the same conduit in order to reduce the reactance loss. Two conduits 581 and 582 are used instead of one conduit for if the conductors in one of the conduits were made of a sufficient size to carry the current, then the conduit would necessarily be altogether too large and inconvenient to manipulate. A third conduit 583 is provided so that upon expansion of the system additional conductors may be run through that conduit in parallel with the conductors within the conduits 581 and 582. The outgoing transformer bus conductors extend through conduits 584 and 585 each containing four conductors, one for each phase, and the neutral, and a third conduit 586 is provided as a spare for future expansion of the system.

A conductor 590 (Figure 28) extends through a porcelain or other suitable insulating bushing 591 between the main bus compartment 592 and the transformer bus compartment 580. Within the transformer bus compartment the conductor 590 is connected to the neutral of the system. A neutral bus conductor 592 extends alongside the main couductors 516. Said neutral conductor extends in a single conductor conduit, as do the main bus conductors. An opening is provided at 595 in the partition wall between the main bus compartment 592 and the transformer bus compartment 552 so that it is possible, if necessary, to extend conductors between the busses 516 and the bus bars 556, 557 and 558 in the transformer bus compartment.

Figure 31:
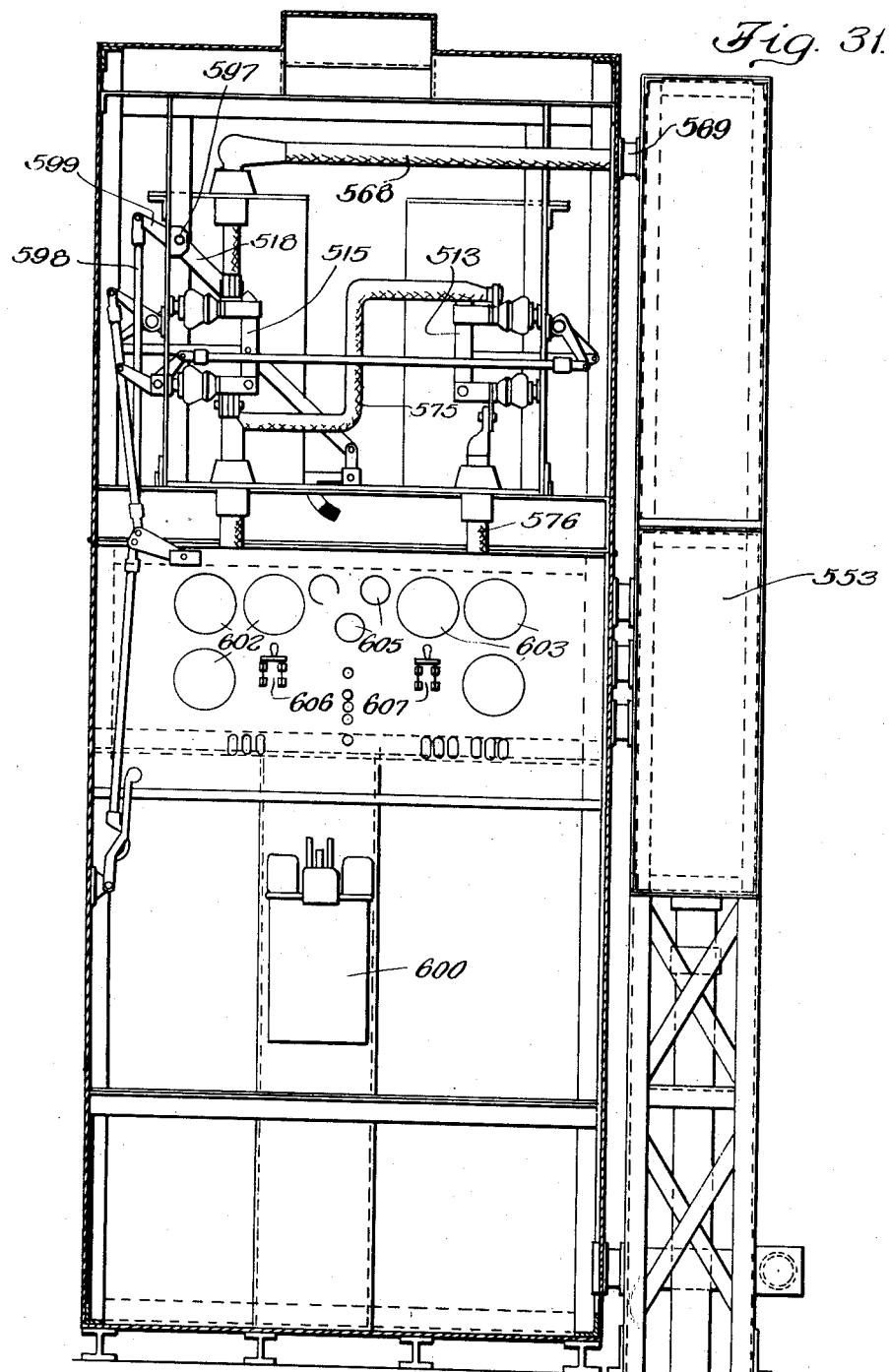
Figure 31 is a view of the front of the transformer switch house with the front wall removed.
Figure 32:
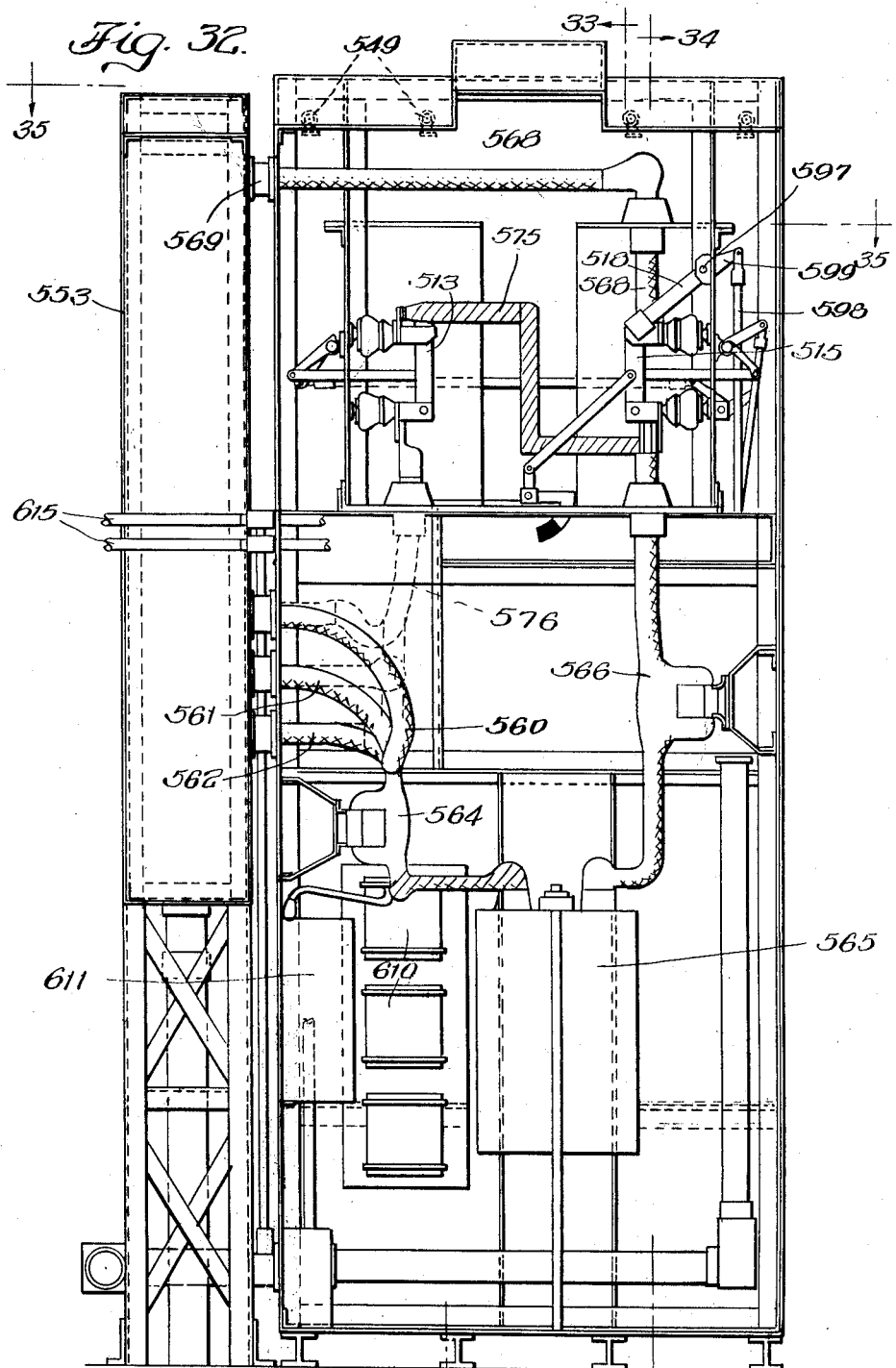
Figure 32 is a rear view of the transformer switch house with the rear wall removed.

The grounding switch 518 for grounding the main bus is seen more particularly in Figures 31 and 32. The switches 518 are pivoted at 597 and may be swung into and out of engagement with the upper terminal clip of the switches 515. The three switches 513, as well as the switches 515 and 518, are gang operated. The three switches 518 are mounted on a common grounded operating shaft which is rotated by means of a rod 598 and a crank 599. The link work for operating the disconnect switches and the grounding switches in this switch house is the same as that provided in the switch houses previously described and the manner of operating the switches, it is believed, will be apparent from the description previously given.

Figure 33:
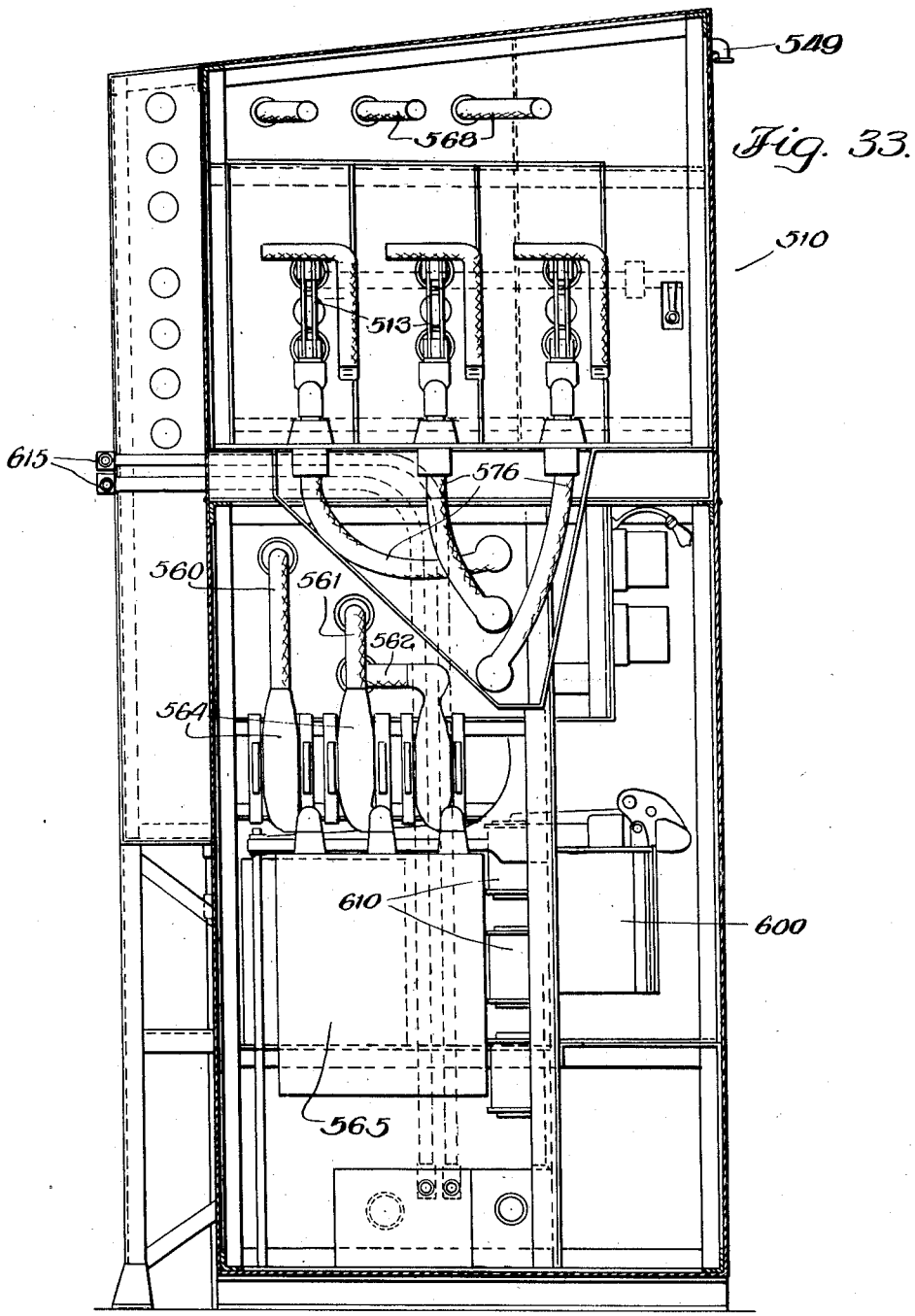
Figure 33 is a section taken along the line 33—33 of Figure 32.
Figure 38:
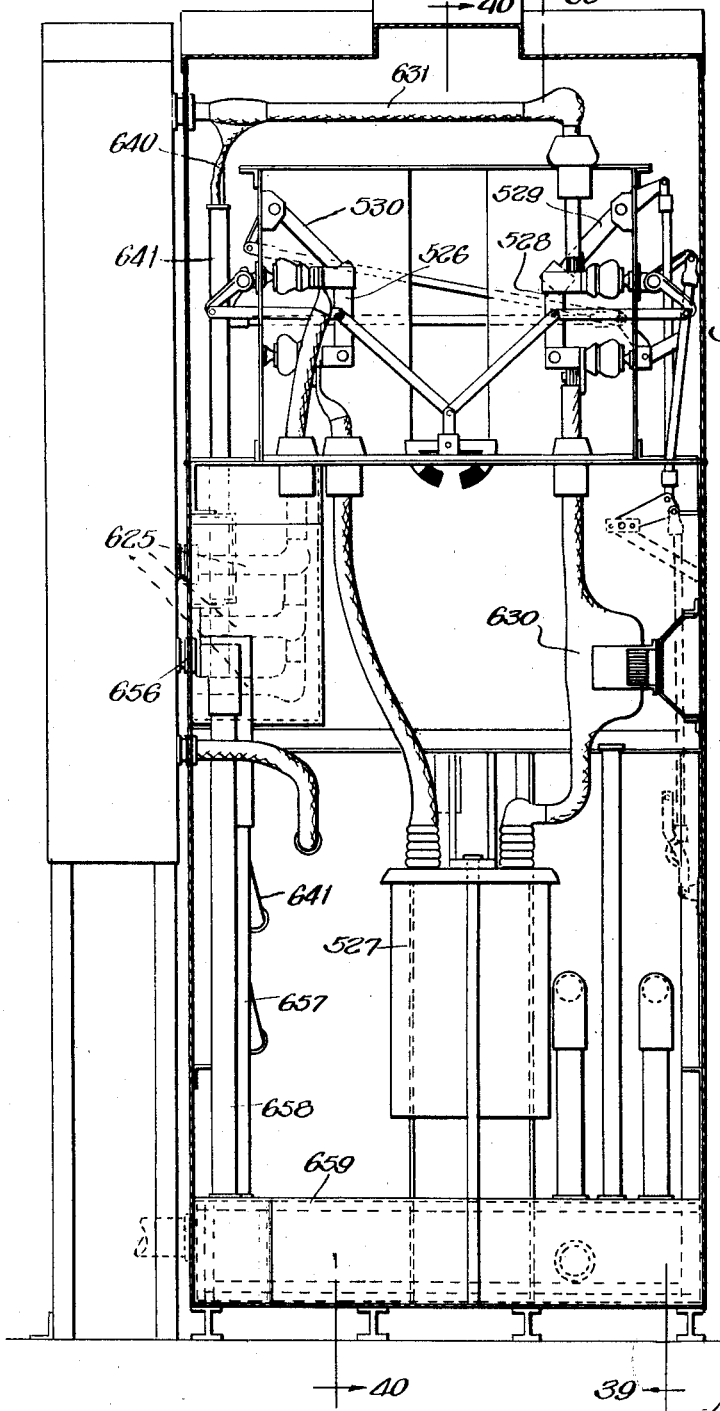
Figure 38 is a rear view of the transfer switch house, being taken along the line 38—38 of Figure 39.

The oil circuit breaker 565 is located as seen in Figures 32, 33 and 34. The operating mechanism for the oil circuit breaker is indicated at 600 and is of the usual construction. The oil circuit breaker is tripped upon the operation of any one of the three cut-out relays 602 or any one of the three cut-out relays 603. The current transformers 564 control the relays 602 so that upon an overload in any one of the phase conductors the corresponding relay 602 is energized to trip the circuit breaker. The current transformers 564 likewise furnish current to the ammeters for measuring the current flowing through the switch house. The transformers 566 are connected in differential to corresponding transformers on the high tension side of the power transformers 500 to control in the usual manner the relays 603 upon the occurrence of an unbalance as between the current in the high tension side and the current in the low tension side of any one of the phase conductors. The knife switches 606 and 607 are provided for disabling the control circuit of the relays 602 and 603, respectively. This permits a testing of the relays without tripping the circuit breaker.

Potential transformers 610 are located within the switch house, as may be seen in Figures 32 and 33. The primary sides of the potential transformers are connected through the fuse cabinet 611 to the respective phase conductors between the current transformers 564 and the oil circuit breaker 565. The secondary sides of the transformers 610 extend to a central measuring and recording point located away from the switch house at any convenient place.

Power conductors for furnishing 110 and 220 volt power for operating the oil circuit breaker and for furnishing light to the switch house extend to the switch house in conduits, as indicated at 615. The operation of the oil circuit breaker may be controlled over the conductors in the conduits 615 from a remote point. The station light and power transformers in this switching center are located outside of the switch houses, as will be explained hereinafter since, owing to the size of the distribution center, those transformers are rather large ones.

Reference may now be had to Figures 36 to 40, inclusive, showing the transfer switch house 524, the circuit for which is shown in Figure 27. In general this switch house is the same as the switch houses previously described differing therefrom in certain particulars to be presently pointed out.

The transformer bus 514 of Figure 27 enters the connecting cabinet through conduits and, in the transformer bus compartment 620 connections are established to the proper connecting bars 621, 622, 623 and 624 in the same manner as was previously described. Conductors 625 extend from the connecting bars 621, 622 and 623 into the switch house 524, as may be seen in Figures 37 and 39. The conductors 625 extend through porcelain bushings into the upper compartment of the switch house and are there connected to the upper terminal clip of the disconnect switches 526.

The grounding switch 530 contacts with the upper terminal clip of the switch 526 for grounding the same. The lower terminal clip of the switch 526 is connected to the oil circuit breaker 527 as may be seen in Figure 38. Conductors from the opposite poles of the circuit breaker 527 extend through current transformers 630 to the lower terminal clip of the transfer bus disconnect switches 528. The grounding switch 529 is provided for grounding the upper terminal clip of the switch 528. The upper terminal clip of the transfer bus disconnect switch 528 is connected by means of conductors 631 that extend through the switch house into the transformer bus compartment 632 (Figure 36) of the transfer switch house connecting cabinet. The transfer bus 522 extends through this cabinet.

The main bus 516 extends through the main bus compartment 633 and in that compartment conductors 634 are connected to the bus and extend through a conduit 635 into the switch house. The conductors enter the switch house through the conduit 635, as may be seen more clearly in Figure 39, and within the switch house extend through a conduit 636 to the station light and power fuse cabinet 637. Similar conductors 640 extend from the transfer bus conductors 631 (Figures 38 and 39) through a conduit 641 to the same cabinet.

The fuse cabinet 637 is shown more particularly in Figures 41, 42 and 43, to be presently described. It is sufficient to state at this time that within this cabinet are mounted the fuses for the high tension side of the station light and power transformers and that switching means is provided in this cabinet for establishing connections between the outgoing conductors that are enclosed in the conduit 643 (Figure 39) and either the conductors within the conduit 636 or those within the conduit 641. The conductors within the conduit 643 extend to the station light and power compartment 650 of the bus connecting cabinet shown in Figure 36 from whence they extend through a conduit 651 to the primary side of the station light and power transformers, said transformers being located outside of the switch house. A fourth conductor 652, which is the neutral of the system, likewise extends through said conduit 651 to the station light and power transformers. Conductors from the secondary side of the station light and power transformers enter the compartment 650, said conductors extending to said compartment in two conduits, the conduit 653 including the 220 volt conductors and the conduit 654 including the 110 volt conductors. The conductors from the conduits 653 and 654 extend through nipples 655 and 656 into the switch house. Within the switch they extend downward through conduits 657 and 658 (Figure 38) to the connection trough 659 from which they extend to the front of the switch house, as may be seen more particularly in Figure 39.

The station light and power is furnished by three transformers connected to furnish 220 volts and tap-offs are taken from the midpoints of two of the transformers to furnish 110 volts. The 220 volt conductors extend directly to the fuse switch cabinet 665 whereas the 110 volt conductors extend to the cabinet 666 by way of a triple pole double throw switch 667. The station light is taken from the midpoint of one only of the two transformers and should that transformer become disabled, the 110 volt power for station lighting purpose may be taken from the other transformer by merely throwing the switch 667 to its opposite position. The fuse switches within the fuse cabinets 665 and 666 are operated by means of handles 668 and 669, respectively, and are interlocked with the door 691 of the fuse cabinet 637 which contains the fuses on the primary side of the station light and power transformers. The arrangement is such that the door 691 cannot be opened to remove or replace the fuses on the primary side of the station light and power transformers until the switch handles 668 and 669 have been operated to the open position, and with the door 691 open, those handles cannot be reoperated to the closed position.

A description will now be given of the fuse cabinet 637 containing the fuses on the high tension side of the station light and power transformers and reference may be had to Figures 41 to 44, inclusive, for this purpose. The conductors from the conduit 636 extend to one set of terminals indicated at 675 of a triple pole double throw switch 676 and the conductors from the conduit 641 extend to the opposite terminals of said switch. The blades 678 are pivoted to the central terminals 679 and from each of the three poles 679 a conductor extends upwardly to the terminals 680 of the fuses 681. Each of the fuses 681 includes a fuse holder within which is mounted a removable enclosed fuse. The structure of the holder and the removable fuse is shown more particularly in my Patent No. 1,887,281, to which reference may be had for a full description. There are three fuses such as 681 and each is connected to one of the three poles 679 of the switch 676. The opposite terminal 682 of the fuse connects with the outgoing conductors that extend through the conduit 643 to the high tension side of the station light and power transformers. The switch 676 is operated by a rotatable shaft 683 which acts through a crank 684 and a lever 685 of suitable insulating material to actuate the switch. The shaft 683 is rotated by means of a handle 686 under the control of an interlocking arrangement, to be presently described. The fuse and switch structure 676 is mounted in a grounded cabinet 690 provided with a hinged door 691 which may be swung about the hinges 692 through an angle of approximately 90°, the bracket 693 limiting the upward swinging motion of the door 691.

An interlock arrangement is provided for interlocking the door 691, the switch operating 686, and the switches on the secondary side of the station light and power circuit. A rod 700 is mounted for turning movement in the brackets 701 and 702 (Figure 43). The rod is bent at 704 to lie over the door 691 so that with the rod in the position shown in Figure 42 the door cannot be opened. The rod 700 may be turned through an angle of approximately 90° by means of a crank 705 acted upon by a rod 706. The hand lever 686 has connected thereto a rod 687 which passes through a notch in a bracket member 688 and abuts against a bell shaped member 689 secured to the top of the locking rod 700. With the rod 700 in the position shown in Figure 42 it is not possible to manipulate the handle 686 due to the fact that the member 687 abuts against the member 689, as may be seen in Figure 44. If the rod 700 is rotated through an angle of 90°, or slightly less, the segment 689 clears the edge of the member 687 thereby permitting the operation of the handle 686. During the movement of the handle 686 the end of the rod 687 is first projected beyond the member 689 and upon continued movement that end is again withdrawn to the position shown in Figures 43 and 44. As may be seen more clearly in Figure 37, the rod 706 extends to the fuse cabinets 665 and 666. The rod 706 is connected to the vertical rotatably mounted interlocking rods 710 and 711 through cranks such as 705 shown in Figure 44.

Upon movement of the rod 706 to the left, as seen in Figure 37, the locking rods 710 and 711 are rotated. Eccentrically mounted levers 715 and 716 are secured to the rods 710 and 711, respectively, so that upon rotation of the rods 710 and 711 those levers are turned into the path of movement of the fuse switch operating levers 668 and 669. These levers are now shown in the switch open position and it is possible to move the locking rod 706 to the left in order to permit an opening of the door 691. When the rod 706 is so moved, the members 715 and 716 are moved into the path of motion of the levers 668 and 669 and it becomes impossible to reclose the switches controlled by the levers 668 and 669 until the rod 706 has been moved back to the right to relock the door 691. As may be seen from Figure 42, it is not possible to return the member 704 to the position shown in Figure 42 until the door 691 has been reclosed, due to the fact that when the door is open it does not clear the top of the portion 704. When the switch levers 668 and 669 are in the switch closed position those levers are in the path of motion of the members 715 and 716 and it is not possible to move the member 706 to the right by an amount sufficient to unlock the door 691 or release the member 687 of Figure 43. It is thus apparent that by means of my present interlocking arrangement it is not possible to insert or remove a fuse on the high tension side of the station light and power transformers nor is it possible to manipulate the switch 676 on that same side of the transformers until the circuit through the secondary sides of those transformers has been opened.

By this arrangement it is possible to use a simpler and more economical form of switch at 676 and likewise a more economical form of fuse mounting, since at no time can these members open a circuit through which current is flowing. The rear doors of the transformer switch house 510 and the rear doors of the transfer switch house 524 are each interlocked with certain of the disconnect switches within those houses so as to prevent inadvertent opening of the switch houses when certain of the switches are in the open or closed position. A locking mechanism identical to that shown in Figures 23 to 26, inclusive, is used. In the case of the transformer switch house the operating rod 400 of Figure 24 is connected to the operating shaft of the main bus oil circuit breaker disconnect switch 515 whereas the lever 400 is connected to the operating shaft of the disconnect switches 513. The arrangement is such that the doors, such as 154 and 154' of Figure 24, cannot be opened until both of those disconnect switches are open, and those disconnect switches cannot be reclosed until both doors have been opened. In the transfer switch house 524 the interlocking mechanism is connected so that the rear doors cannot be opened until both the disconnect switches 528 and the disconnect switches 526 have been opened, and the switches cannot be reclosed until the doors have been closed. In this case, the rod 400 is connected to the operating shaft of the disconnect switches 528, and the rod 401 is connected to the operating shaft of the switches 526.

A Cory interlock similar to the Cory locks previously described is provided at the rear doors of the transformer switch house 514. The key from the Cory interlock controls a lock which is connected to the switches that control the energization and deenergization of the high tension busses 505 and 506. The arrangement is such that the disconnect switches from the busses 505 and 506 cannot be operated until the doors at the rear of the transformer switch house 514 have been unlocked, which is possible only after the switches 513 and 515 have been opened, thus opening the low tension side of the transformer bank 500. This Cory interlock is similar to the interlock provided on the high tension side of the transformer bank 381 of Figure 22, the interlock being controlled by a key transfer and lock similar to that described in connection with Figure 21.

Within the transformer switch house the disconnect switches 513 and 515 are interlocked with the operating mechanism for the oil circuit breaker 565. The interlock mechanism is of the same construction as that shown in Figures 15 to 18, inclusive, and a further description thereof need not be given at this time. It may be sufficient to state that the interlocking mechanism is so arranged that the oil circuit breaker may be opened or closed regardless of the position of the disconnect switches whereas the disconnect switches cannot be operated to either the open or the closed position when the oil circuit breaker is closed. The disconnect switches can only be operated when the oil circuit breaker is open.

Within the transfer switch house 524 there is provided a mechanical interlock similar to that shown in Figures 15 to 18, inclusive, between the oil circuit breaker 527 and the transformer disconnect switch 528 and the transfer disconnect switch 526. Here again the arrangement is such that neither of the switches 526 or the switches 528 can be opened or closed when the oil circuit breaker 527 is closed. A Cory interlock similar to that shown in Figure 21 is provided to interlock the disconnect switches 538, 526, and 513 (Figure 27). The arrangement is such that the switch 513 is maintained in the locked position by the Cory lock, and the Cory lock cannot be released until the switches 538 and 526 have been opened thereby releasing certain Cory keys which may be used to unlock the lock holding the switch 513 closed. When the switch 513 is open the keys are held in the lock thereby preventing the reclosing of the switches 538 and 526. Standard Cory locks, such as have been previously described, are used.

In compliance with the requirements of the Patent Statutes I have herein shown and described a preferred embodiment of my invention. It is, however, understood that the invention is not limited to the precise construction set forth, the same being merely illustrative. What I consider new and desire to secure by Letters Patent is:

1. An electric distribution center comprising a plurality of outgoing feeders, an enclosed sheet metal switch house for each feeder, busses extending through all of said switch houses, switching means in each switch house for establishing connections between the outgoing feeder and the busses, an additional enclosed switch house into which said busses extend, incoming power conductors extending into said last mentioned switch house, switching means in said last mentioned switch house for establishing connections between said power conductors and said busses for energizing said busses, and interlocks between certain of the switches in the last mentioned switch house and certain of the switches in each of the first mentioned switch houses.

2. In an electric system, a switch house, a bus connecting cabinet adjacent thereto, said cabinet having a number of separate compartments, power conductors extended within the respective compartments, and electrical connections extending from the respective compartments to the switch house, said cabinet having openings between the compartments for the establishment of connections between the conductors in various compartments independent of the switch house.

3. In an electric system, a switch house and a connecting cabinet adjacent one another, line conductors entering the cabinet, a main bus extending through the cabinet, a transfer bus extending through the cabinet, connections within the cabinet and extending from said busses and from said line conductors to the switch house, and switching means in the switch house for interconnecting the line conductors with either of the busses at will, said busses and said line conductors being in separate compartments, there being openings between said compartments to permit the establishment of a direct connection between the line conductors and either of the busses at will.

4. In an electric system, a plurality of isolated switch houses, switching means within the switch houses, interlocks between certain of the switches in each of the switch houses, and means for interlocking certain of the switches in different switch houses with one another.

5. In an electric distribution center, a plurality of feeders, an individual switch house for each feeder, a totalizing metering switch house, switching means in each of the switch houses, and interlocks between certain of the switches in the feeder switch houses and certain of the switches in the totalizing metering switch house.

6. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, interlocks in each switch house for interlocking the switches therein, and means for interlocking certain of the switches in each of said last mentioned switch houses with certain of the switches in the first mentioned switch house.

7. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, doors for said switch houses, and interlocks between the doors of each switch house and certain of the switches therein.

8. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, interlocks in each switch house for interlocking the switches therein, means for interlocking certain of the switches in each of said last mentioned switch houses with certain of the switches in the first mentioned switch house, doors for said switch houses, and interlocks between the doors of each switch house and certain of the switches therein.

9. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, each of said switch houses comprising an upper and a lower section, said switching means including gang operated disconnect switches mounted in the upper section and an oil circuit breaker in the lower section, and means associated with the individual blades of certain of the gang switches for indicating in the lower section the open or closed position of those switch blades.

10. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, each of said switch houses comprising an upper and a lower section, said switching means including gang operated disconnect switches mounted in the upper section, an oil circuit breaker in the lower section, means associated with the individual blades of certain of the gang switches for indicating in the lower section the open or closed position of those switch blades, and means in the lower section for operating the switches in the upper section.

11. An outdoor electric power distributing center comprising a sheet metal switch house, a power line extending into said switch house, main and transfer busses extending from said switch house, switching means within the switch house for establishing a connection between said power line and either of said busses, a plurality of switch houses similar to said first switch house and in proximity thereto, said busses extending through all of said switch houses, feeders outgoing from each of said last mentioned switch houses, switching means in each of said switch houses for selectively establishing a circuit between said feeders and said busses, doors for permitting access to the front of the switch house, doors for permitting access to the rear of the switch house, and interlocks between the rear doors of the switch house and certain of the switches therein, said interlocks preventing access to the rear of the switch house while the switches are in a position to render the conductors in the switch house electrically alive.

12. In a distribution center, a switch house, a feeder and power busses extending into said switch house, switching means within the switch house for interconnecting the feeder and the busses, a rear door for permitting entry into the switch house for inspection or repair purposes, and interlocks between the door and certain of the switches for preventing opening of the door when those switches are closed.

13. An outdoor electric switch house comprising a sheet metal housing, a partition dividing the housing into two sections, air break switches mounted in one section, operating means for said switches in the other section, said operating means being located adjacent the front of the switch house to permit ready access thereto, doors for closing the switch house, doors at the rear of the switch house, and interlocks between the switches and the rear doors for controlling the opening of the rear doors.

14. A sheet metal switch house comprising an upper and a lower section, a partition separating the sections, air break switches mounted in the upper section, electrical connections in the lower section extending to the switches in the upper section, doors at the lower section to permit access to the lower section of the switch house, and a roof for the upper section of the switch house, said roof comprising a plurality of sections for permitting access to the upper section of the switch house.

15. A sheet metal switch house comprising an upper and a lower section, a partition separating the sections, air break switches mounted in the upper section, electrical connections in the lower section extending to the switches in the upper section, doors at the lower section to permit access to the lower section of the switch house, a roof for the upper section of the switch house, said roof comprising a plurality of sections for permitting access to the upper section of the switch house, and ventilators adjacent the top of the top section for permitting a circulation of air through the switch house.

16. A sheet metal switch house including an upper and a lower section, a flame proof partition separating the two, main and transfer busses extending into the upper section, main and transfer bus disconnect switches mounted on opposite sides of the upper section of the switch house, electrical connections extending from each of said switches into the lower section of the switch house, and operating means for each of said switches extending along one side of the switch house into the lower section of the house.

17. A sheet metal switch house including an upper and a lower section, a flame proof partition separating the two, main and transfer busses extending into the upper section, main and transfer bus disconnect switches mounted on opposite sides of the upper section of the switch house, electrical connections extending from each of said switches into the lower section of the switch house, operating means for each of said switches extending into the lower section of the switch house at the front side thereof, doors at the rear of the lower section of the switch house, and interlocks between the switches and the rear doors.

18. In a switch house, an upper and a lower section, a set of doors for permitting access to the lower section, two sets of switches in the upper section, mechanical connections extending from said sets of switches to the doors, and means including said connections for interlocking both of said doors with both of said sets of switches so that neither of the switches can be operated when either door is open and neither door can be opened when either of the sets of switches is in a given one of its positions.

19. An outdoor electric power distribution center comprising high tension lines, a plurality of transformer banks for stepping the voltage of said lines down to suitable distribution values, a transformer switch house associated with each transformer bank, connections extending from the low voltage side of each transformer bank to the associated switch house, a transformer bus extending through all of said switch houses, separate main busses extending through each of said switch houses, a plurality of feeder switch houses associated with each transformer switch house, the main busses of each transformer switch house extending through the associated feeder switch houses, a transfer bus extending through all of said feeder switch houses, a feeder outgoing from each feeder switch house, switching means in each transformer switch house for selectively establishing connections between the associated transformer bank and either the associated main bus or the common transformer bus, a transfer switch house, said transformer and transfer busses extending into said transfer switch house, switching means in said transfer switch house for establishing connections between said transformer and said transfer busses, and switching means in each feeder switch house for extending connections between the outgoing feeder and the associated main bus or the common transfer bus at will.

20. A distribution center such as set forth in claim 19 wherein all of the busses between the switch houses are conduit enclosed, and the conductors between the low tension sides of the transformer bank and the transformer switch houses are conduit enclosed.

21. In an electric system, a step down transformer, fuses on the high voltage side of the transformer, switches on the low voltage side, and interlocks between the switches and the fuses for preventing the manipulation of the fuses while the switches are closed.

22. In an electrical distribution center, a sheet metal switch house, power conductors at the voltage of the distribution system extending into said switch house, doors at the front of the switch house, a fuse and switch cabinet for the station light and power circuit mounted in the switch house at the front thereof, connections extending into said cabinet from said power conductors, step down transformers at the distribution center for furnishing the station light and power current, connections from the cabinet to the high voltage side of the transformers, a switch and fuse cabinet mounted in the switch house and connected to the secondary side of the transformers, and interlocks between the two cabinets for preventing manipulation of the switches and of the fuses in the high voltage cabinet while the switches in the low voltage cabinet are closed.

23. In a high voltage electric system, a switch house comprising two sections separated by a flame proof insulating partition, a plurality of disconnect switches mounted in one section, means mounted in the other section and electrically connected to said switches, means in said other section for controlling the switches, and additional means associated with each of said switches for indicating in said other section the open or closed position of said switches, thereby indicating whether or not it is safe to work upon said first mentioned means.

24. In an electric system, a portable switch house and a bus connecting cabinet adjacent one another and constituting a structural unit, said cabinet projecting beyond one side of the switch house, a power line extending into the cabinet and from the cabinet into the switch house, main and transfer buses extending through the cabinet at the projecting end thereof, conductors connected to the respective buses in the cabinet and extending into the switch house, said switch house comprising upper and lower sections separated by a flame-proof partition, main and transfer bus disconnect switches mounted on opposite sides of the upper section of the switch house, a circuit breaker in the lower section of the switch house, and operating means in the lower section of the switch house for operating the switches in the upper section, said switches, circuit breaker, and conductors constituting means for connecting the power line to either of the buses.

ERNST BLOMQUIST.